(12) United States Patent
Tomofuji et al.

(10) Patent No.: US 7,088,922 B2
(45) Date of Patent: Aug. 8, 2006

(54) WAVELENGTH DIVISION MULTIPLEXING OPTICAL COMMUNICATION SYSTEM

(75) Inventors: Hiroaki Tomofuji, Kawasaki (JP); Hiroshi Onaka, Kawasaki (JP); Terumi Chikama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 10/405,936

(22) Filed: Apr. 3, 2003

(65) Prior Publication Data

US 2003/0215233 A1  Nov. 20, 2003

Related U.S. Application Data

(63) Continuation of application No. PCT/JP01/08263, filed on Sep. 21, 2001.

(30) Foreign Application Priority Data

Oct. 4, 2000  (JP) .............................. 2000-304315

(51) Int. Cl.
*H04J 14/02* (2006.01)
*H04B 10/04* (2006.01)

(52) U.S. Cl. ..................... 398/95; 398/192; 398/196; 398/79

(58) Field of Classification Search ................. 398/27, 398/79, 83, 95, 192, 196
See application file for complete search history.

(56) References Cited

U.S. PATENT DOCUMENTS

| 5,005,166 A * | 4/1991 | Suzuki et al. ................. 398/47 |
| 5,867,289 A * | 2/1999 | Gerstel et al. ................ 398/12 |
| 6,192,172 B1 * | 2/2001 | Fatehi et al. .................. 385/17 |
| 6,288,808 B1 * | 9/2001 | Lee et al. ...................... 398/49 |
| 6,577,652 B1 * | 6/2003 | Kamata ....................... 370/535 |

FOREIGN PATENT DOCUMENTS

| JP | 2-137411 | 5/1990 |
| JP | 10-135931 | 5/1998 |
| JP | 11-27238 | 1/1999 |
| JP | 2000-197077 | 7/2000 |

OTHER PUBLICATIONS

M. Shirasaki et al., "Virtually Imaged Phased Array With Graded Reflectivity", IEEE Photonics Technology Letters, vol. 11, No. 11, Nov. 1999, pp. 1143-1444.
M. Shirasaki, "Large Angular Dispersion By A Virtually Imaged Phased Array And Its Application to a Wavelength Demultiplexer", Optics Letters vol. 21, No. 5, Mar. 1, 1996, pp. 366-367.

(Continued)

*Primary Examiner*—Leslie Pascal
*Assistant Examiner*—Dalzid Singh
(74) *Attorney, Agent, or Firm*—Staas & Halsey LLP

(57) ABSTRACT

The present invention aims to provide a WDM optical communication system that can arrange efficiently optical signals of a plurality of bit rates at different wavelength spacing. To this end, for example, a basic constitution of a demultiplexing section to be applied to the WDM optical communication system of the present invention is provided with a demultiplexer that demultiplexes WDM signal light into $2m$ components in accordance with a plurality of wavelength regions set according to minimum wavelength spacing, $2m$ optical switches, each of which has one input port to which light from the demultiplexer is input, and a plurality of output ports, that selects one of the plurality of output ports to connect it to the input port, and m multiplexers that each multiplexes each output light of the $2m$ optical switches, wherein switching operations of the optical switches is set such that the bandwidth of each optical signal is approximately the same as the wavelength arrangement spacing corresponding to each bit rate.

14 Claims, 17 Drawing Sheets

OTHER PUBLICATIONS

Lih Y. Lin, et al., "Optical-Layer Networking Opportunities for and Progress in Lightwave Micromachines OFC 2000 Tutorials", Mar. 10, 2000, pp. 62-106.

J.S. Patel, et al., "Liquid Crystal and Grating-Based Multiple-Wavelength Cross-Connect Switch", IEEE Photonics Technology Letters vol. 7, No. 5, May 1995, pp. 514-516.

Al R. Ranalli, et al., "Liquid Crystal-Based Wavelength Selectable Cross-Connect", ECOC'99, Sep. 26-30, 1999, Nice, France, Sep. 26, 1999.

D.T. Neilson, et al., Fully Provisional 112×112 Micro-Mechanical Optical Crossconnect With 35.8Tb/s Demonstrated Capacity Optical Fiber Communications Conference (OFC 2000), Post Deadline Paper PD-12, Mar. 2000.

* cited by examiner

FIG.1
FIRST BASIC CONSTITUTION OF PRESENT INVENTION
(A) DEMULTIPLEXING SECTION
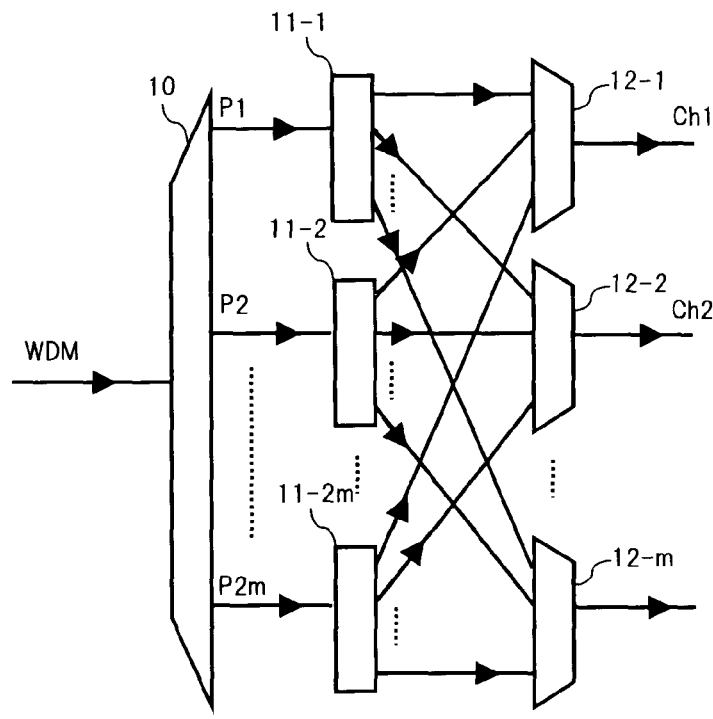
(B) MULTIPLEXING SECTION
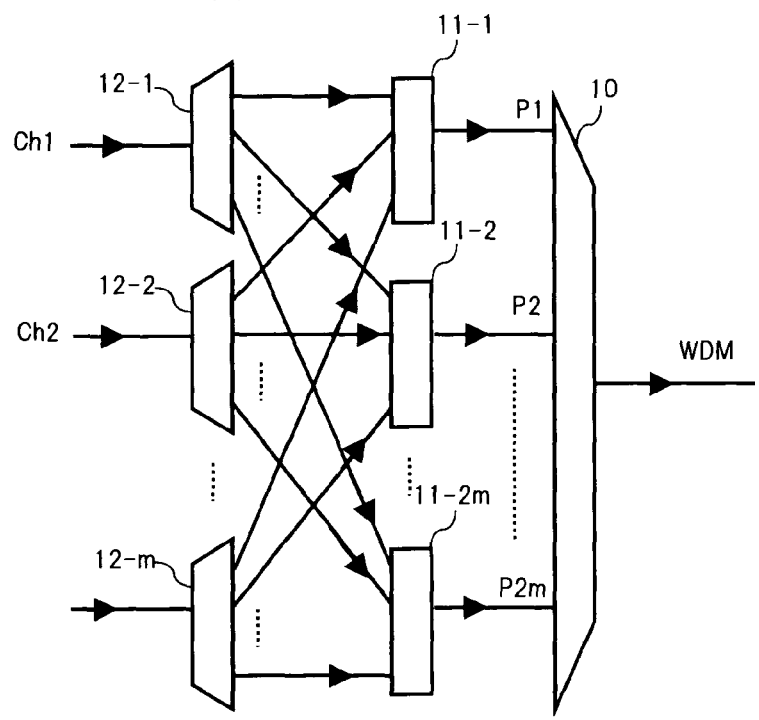

FIG.3
SECOND BASIC CONSTITUTION OF PRESENT INVENTION
(A) DEMULTIPLEXING SECTION
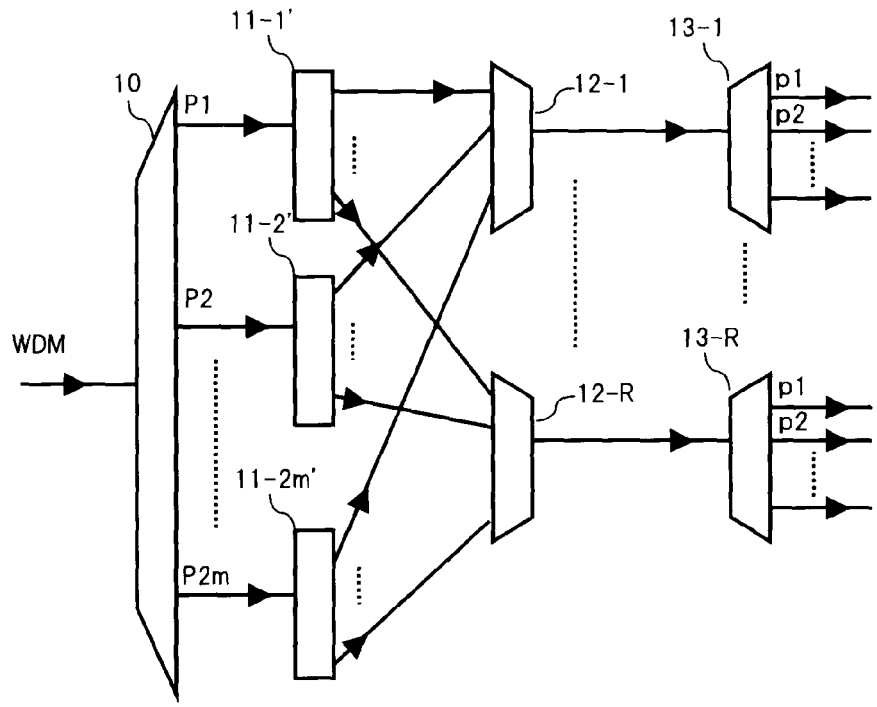
(B) MULTIPLEXING SECTION
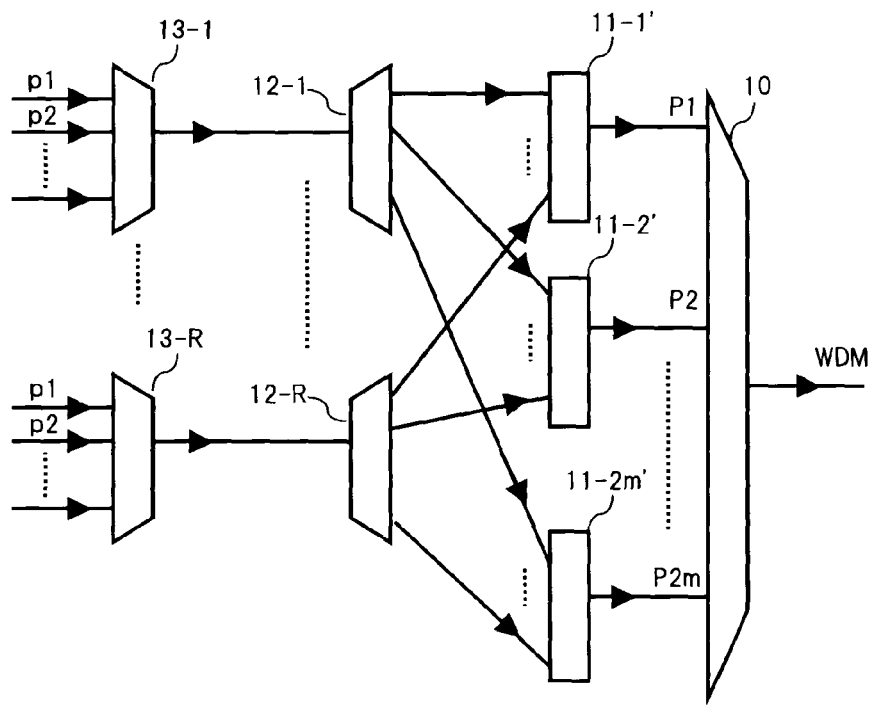

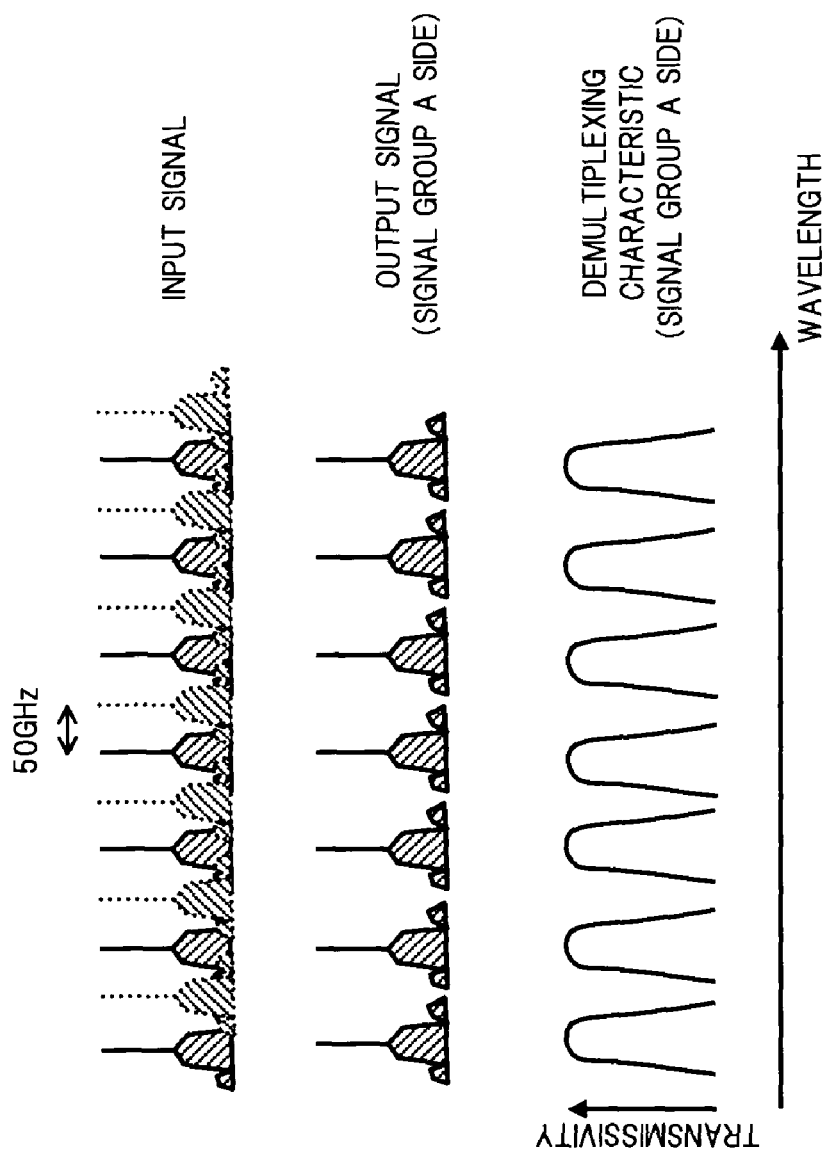

WAVELENGTH DIVISION MULTIPLEXING OPTICAL COMMUNICATION SYSTEM

This application is a continuing application, filed under 35 U.S.C. § 111(a), of International Application PCT/JP01/08263, filed Sep. 21, 2001, it being further noted that foreign priority benefit is based upon Japanese Patent Application 2000-304315, filed Oct. 4, 2000.

TECHNICAL FIELD

The present invention relates to a wavelength-division multiplexing (WDM) optical communication system for transmitting a plurality of optical signals with different wavelengths collectively. In particular, the invention relates to an optical transmission terminal apparatus, an optical reception terminal apparatus and an optical add drop apparatus, that accommodate optical signals of a plurality of bit rates arranged at different wavelength spacing, and a WDM optical communication system constituted using these apparatuses.

BACKGROUND ART

In recent years, optical communication systems of further longer distance and further larger capacity have been required for multimedia networks, along with the construction of optical networks using them. A WDM system is one of the systems for realizing large capacity, for which considerable research and development have been carried out Furthermore, in WDM optical communication systems, it is required to increase a transmission speed (bit rate) per one wavelength according to the development of high speed electronic circuits in optical sender and receiver, to increase transmission capacity. This requires upgradability capable of responding to a higher transmission speed, and the use in a state where optical signals of a plurality of bit rates, for example 40 Gb/s, 10 Gb/s, 2.5 Gb/s and the like, are intermixed.

An example of WDM optical communication system that is currently being developed is a system in which the highest transmission speed is approximately 10 Gb/s, and the wavelength spacing (wavelength arrangement spacing) is 50 GHz or the like. In an optical transmission terminal apparatus, an optical reception terminal apparatus and an optical add drop apparatus, which constitute such a WDM optical communication system, processes of multiplexing optical signals with respective wavelengths (channels), and demultiplexing them for each wavelength are performed. At the time of such multiplexing and demultiplexing of wavelengths, an optical filter is typically used, so that flatness in a filter band of each channel becomes important. That is, if the flatness is insufficient, then a part of signal light component is cut off, thus producing waveform distortion. Therefore, the flatness over a wide band is required as the transmission speed gets higher. Furthermore, if a large number of optical add drop apparatuses and the like are inserted in the transmission path, since the number of filters through which the signal light passes are increased, the more strict flatness is required.

In order to satisfy the flatness in a filter band, in the case of transmitting an optical signal of 10 Gb/s at 50 GHz spacing, for example, a technique is known in which an optical filter called an interleaver is combined with an optical filter that demultiplexes or multiplexes optical signals at 100 GHz spacing or 200 GHz spacing utilizing an AWG, a film filter or the like. In this conventional technique, in the case of demultiplexing WDM signal light, for example, the WDM signal light is demultiplexed into two signal groups using the interleaver, and further, light of each optical group is demultiplexed into optical signals with each wavelength by the optical filter utilizing the AWG, the film filter or the like. As shown in FIG. 17, the above-described interleaver is a known optical filter that has a function for demultiplexing input signals (upper part of the figure) at 50 GHz spacing into a signal group A (solid lines in the figure) at 100 GHz spacing, and a signal group B (dotted lines in the figure) at 100 GHz spacing, which is shifted by 50 GHz from the signal group A. Here, the middle and lower parts of FIG. 17 show output signals and demultiplexing characteristic of the interleaver, corresponding to the signal group A.

In trying to demultiplex optical signals at 50 GHz spacing using only an optical filter using an AWG, a film filter or the like, it is difficult to ensure flatness in a filter band. However, by separating into signals at 100 GHz spacing using the interleaver as described above, filter bandwidth of the AWG, the film filter or the like is extended, so that it is easy to obtain band flatness.

Here, there has been shown the case where the WDM signal light is demultiplexed into each wavelength. However, in the case of multiplexing optical signals with different wavelengths at 50 GHz spacing, it is also possible to multiplex respective optical signals by reversing an input and output relationship of optical signals at the time of multiplexing as described above.

Incidentally, in the conventional WDM optical communication system as described above, in order to accommodate as many optical signals as possible in a predetermined wavelength band, there is a tendency to attempt to narrow the wavelength spacing of each optical signal. However, since a required bandwidth for optical signals with each wavelength exists according to the transmission speed, there is a limit when trying to narrow the wavelength spacing. That is, if the transmission speed of an optical signal gets higher, the required bandwidth as described above is widened. Therefore, if the wavelength spacing of each optical signal is made too narrow, such bandwidth cannot be ensured, resulting in a problem in that the transmission cannot be performed.

For example, if it is attempted to transmit an optical signal with a transmission speed of 40 Gb/s at 50 GHz spacing, crosstalk with neighboring wavelengths is predicted, so the optical transmission at such wavelength spacing is considered to be difficult. Therefore, in a 40 Gb/s WDM optical communication system, investigations with the wavelength spacing of 100 GHz have been made.

Furthermore, as described above, WDM optical communication systems are required to be used in the state where optical signals of various bit rates are intermixed, and to have upgradability to higher speed bit rates. In order to use the conventional WDM optical communication system in the state where optical signals of various bit rates are intermixed, since it is necessary to select the wavelength spacing from the beginning (designing stage) so as to be adapted to an optical signal of a maximum bit rate supported by the system, there is a problem in that accommodation efficiency of optical signals of lower bit rates becomes poor. Moreover, in a system wherein the wavelength spacing is optimized corresponding to one existing bit rate, if the bit rate is made higher, there occurs necessity to increase the bit rates of all channels, and to exchange or reduce optical multiplexers and demultiplexers, and the like. Therefore, there is another problem in that it is difficult to respond to higher bit rates flexibly, The present invention has been accomplished in view of the above-described problems, with an object of providing a WDM optical communication system that can efficiently arrange wavelengths of optical signals of a plurality of bit rates at different wavelength spacing, and can respond to the upgrade to higher bit rates flexibly.

DISCLOSURE OF THE INVENTION

To achieve the above objects, the present invention provides a wavelength division multiplexing optical communication system for transmitting wavelength division multiplexed signal light in which optical signals of a plurality of bit rates at different wavelength arrangement spacing are arranged in a predetermined signal wavelength band, wherein when performing at least one of a demultiplexing process for demultiplexing wavelength division multiplexed signal light to generate a plurality of optical signals and a multiplexing process for multiplexing a plurality of optical signals to generate wavelength division multiplexed signal light, in accordance with a plurality of wavelength regions into which the signal wavelength band is divided on the basis of a wavelength width unit set according to a minimum wavelength arrangement spacing, the wavelength division multiplexing optical communication system includes a signal processing section capable of setting band width of each optical signal to an integral multiple of the wavelength width unit, and the signal processing section sets each bandwidth of each of the optical signals of different bit rates so as to approximately coincide with the wavelength arrangement spacing corresponding to each bit rate.

In such a WDM optical communication system, since the demultiplexing process or the multiplexing process, which is performed in accordance with a plurality of wavelength regions into which the signal wavelength band of the WDM signal light is divided, is performed in a state where the bandwidth for each optical signal is set to the integral multiple of the wavelength width unit and also approximately coincides with the wavelength arrangement spacing corresponding to each bit rate, it is possible to demultiplex or multiples the optical signals in a state where a required bandwidth corresponding to each bit rate is ensured. As a result, it becomes possible to realize a WDM optical communication that accommodates optical signals of a plurality of bit rates at different wavelength arrangement spacing efficiently.

The technique according to the present invention as described above can be applied specifically to an optical transmission terminal apparatus, an optical reception terminal apparatus and an optical add drop apparatus, respectively.

Other objects, features and advantages of this invention will become apparent from the following description of embodiments in relation to the accompanying drawings.

BRIEF DESCRIPTION OF THE DRAWINGS

FIG. 1 is a block diagram showing a first basic constitution of the present invention, in which (A) is a constitution of a demultiplexing section, and (B) is a constitution of a multiplexing section.

FIG. 3 is a block diagram showing a second basic constitution of the present invention, in which (A) is a constitution of a demultiplexing section, and (B) is a constitution of a multiplexing section.

FIG. 17 is a diagram explaining a characteristic of a typical interleaver.

BEST MODE FOR CARRYING OUT THE INVENTION

Firstly, a basic constitution of the present invention will be described using drawings.

Figure 2:
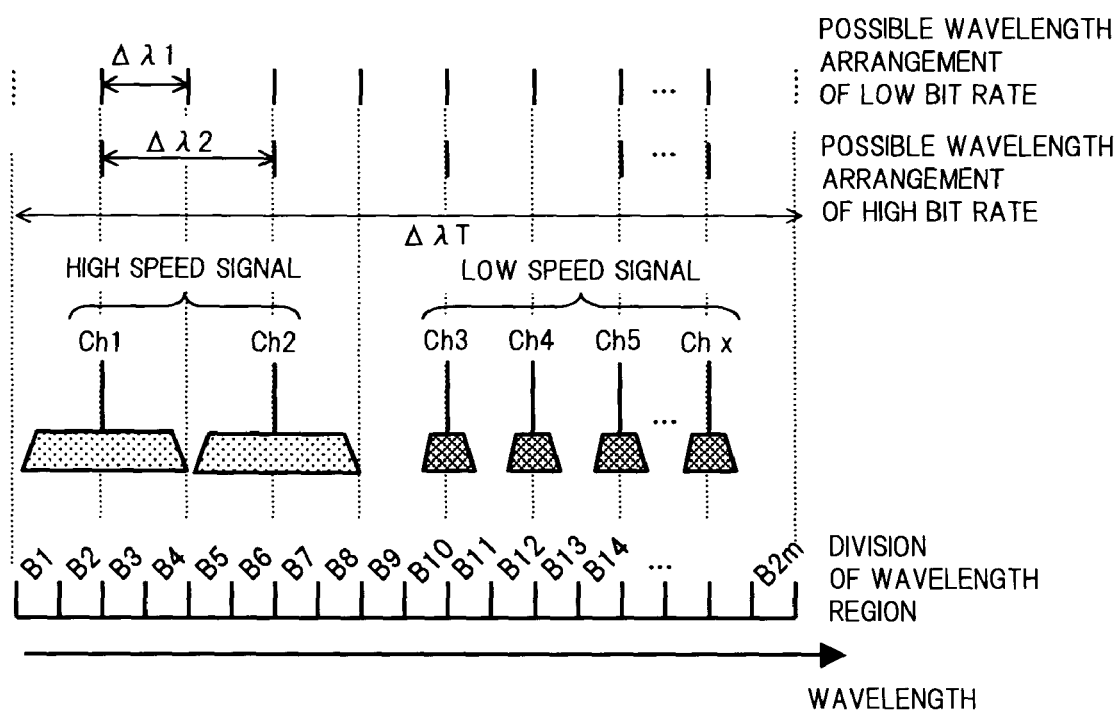
FIG. 2 shows an example of an assignment of wavelength regions and the like corresponding to the first basic constitution.

FIG. 1 is a block diagram showing a first basic constitution of the present invention, to be applied to a WDM optical communication system, in which (A) is a constitution of a demultiplexing section that demultiplexes WDM signal light into respective wavelengths, and (B) is a constitution of a multiplexing section that multiplexes optical signals with respective wavelengths. Furthermore, FIG. 2 shows an example of an assignment of wavelength regions corresponding to the basic constitution of FIG. 1. Note, in the following description, the constitution of the demultiplexing section will be described. Since the constitution of the multiplexing section can be considered similarly by reversing an input and output relationship in the demultiplexing section, corresponding parts are denoted by the same symbols and the description thereof is omitted.

In (A) of FIG. 1, the demultiplexing section comprises a demultiplexer 10 that demultiplexes input WDM signal light for each of a plurality of wavelength bands (2m in number in the figure), 1 input m output (1×m) optical switches 11-1, 11-2, . . . , 11-2m of 2m in number installed corresponding to output ports P1 through P2m of the demultiplexer 10 respectively, and multiplexers 12-1, 12-2, . . . 12-m of m in number that multiplex output signals from the optical switches 11-1 through 11-2m for output.

Here, it is assumed that the WDM signal light input to the demultiplexing section includes optical signals of low bit rate and optical signals of high bit rate. This WDM signal light has a signal wavelength band of $\Delta\lambda T$ as shown at an upper part of FIG. 2 for example, and in the signal wavelength band $\Delta\lambda T$, the optical signals of low bit rate are arranged at wavelength spacing $\Delta\lambda 1$, and the optical signals of high bit rate are arranged at wavelength spacing $\Delta\lambda 2$. It is assumed that since the wavelength spacing $\Delta\lambda 2$ of the optical signals of high bit rate is typically given by an integral multiple of the wavelength spacing $\Delta\lambda 1$ of the optical signals of low bit rate, a relationship of $\Delta\lambda 2/\Delta\lambda 1=R$ is established where R is an integer. Here, regarding the wavelength spacing $\Delta\lambda 1$ at the low bit rate, the maximum number of optical signals that can be arranged in the signal wavelength band $\Delta\lambda T$ is m ($=\Delta\lambda T/\Delta\lambda 1$).

The demultiplexer 10 is a wavelength selection element that demultiplexes input signal light in accordance with wavelength regions B1, B2, B3, . . . , B2m (refer to a lower part of FIG. 2) obtained by dividing the signal wavelength band $\Delta\lambda T$ into 2m in number, and outputs each light to output ports P1 to P2m corresponding to the wavelength regions B1 to B2m, respectively. A diffraction grating, a spectroscope (prism) or the like, for example, can be used for this demultiplexer 10. Furthermore, instead of the diffraction grating, it is also possible to use a VIPA (Virtually-Imaged Phased-Array) as disclosed in an article "Virtually Imaged Phased Array with Graded Reflectivity", by M. Shirasaki, A. N. Akhter, C. Lin, IEEE Photon. technol. lett, vol. 11, No. 11, November 1999, an article "Large angular dispersion by virtually imaged phase array and its application to wavelength demultiplier" by M. Shirasaki, OPTICS LETTERS, Vol. 21, No. 5, Mar. 1, 1996, and the like. If this VIPA is used, a large dispersion angle can be obtained, thus enabling to achieve a small sized demultiplexing section.

Each of the above-described wavelength regions B1 to B2m has half the wavelength width (a wavelength width unit) of the wavelength spacing $\Delta\lambda 1$ of low bit rate. For a specific setting example of the wavelength regions B1 to B2m, regions are possible in which spacing between grid wavelengths (wavelength spacing 100 GHz) standardized by the ITU is further divided into integral multiples (especially two times or four times).

The 1×m optical switches 11-1 to 11-2m are typical optical switches, each of which has one input port and m output ports, and switches light input from the demultiplexer 10 at the input port to be output from any one of the m output ports. A specific example of such optical switches 11-1 to 11-2m is an MEMS (Micro-ElectroMechanical System) switch. Note, the MEMS switch is a known optical switch as disclosed in "Optical-Layer Networking; Opportunities for and Progress In Lightwave Micromachines", OFC 2000 Tutorials, published by AT & T Corporation, and the like. The 1×m optical switches 11-1 to 11-2m are spatially arranged in successive, receive each light demultiplexed successively in a space by the demultiplexer 10 at each input port, to output each light from any one of the output ports of each switch.

The multiplexers 12-1 to 12-m are typical optical multiplexing devices, each of which has 2m input ports corresponding to the optical switches 11-1 to 11-2m, and multiplexes optical signals input to each input port, to output the multiplexed light from one output port to the exterior. Specific examples of the multiplexers 12-1 to 12-m are a diffraction grating, a spectroscope (prism), and the like.

Next is a description of an operation of a demultiplexing section having the first basic constitution as described above.

Here, as shown in a middle part of FIG. 2 for example, WDM signal light, in which optical signals Ch1 and Ch2 of high bit rate, and optical signals Ch3, Ch4, . . . Chx (here, x<m) of low bit rate, are positioned at required wavelength spacing in sequence from a shorter wavelength side of the signal wavelength band $\Delta\lambda T$, is input to the demultiplexer 10. In the demultiplexer 10 to which such WDM signal light is input, when the WDM signal light is demultiplexed in accordance with the wavelength ranges B1 to B2m, an optical component corresponding to the wavelength region B1 is sent to the optical switch 11-1 via the output port P1, an optical component corresponding to the wavelength region B2 is sent to the optical switch 11-2 via the output port P2, and similarly hereunder, optical components corresponding to the wavelength regions B3 to B2m are sent to the optical switches 11-3 to 11-2m, respectively.

In each of the optical switches 11-1 to 11-2m, light sent to the input port from the demultiplexer 10 is output from one output port set in advance according to the wavelength arrangement of optical signals. Here, a switching operation of each of the optical switches 11-1 to 11-2m is set according to the wavelength arrangement of the optical signals Ch1 to Chx of each channel as shown in the middle part of FIG. 2. To be specific, the switching operations of the optical switches 11-1 to 11-4 are set so as to select the output ports connected to the multiplexer 12-1 from the m, output ports corresponding to the optical signal Ch1 at high bit rate, and the switching operations of the optical switches 11-5 to 11-8 are set so as to select the output ports connected to the multiplexer 12-2 from the m output ports corresponding to the optical signal Ch2 at high bit rate. Furthermore, the switching operations of the optical switches 11-10 and 11-11 are set so as to select the output ports connected to the multiplexer 12-3 from the m output ports corresponding to the optical signal Ch3 at low bit rate, the switching operations of the optical switches 11-12 and 11-13 are set so as to select the output ports connected to the multiplexer 12-4 from the m output ports corresponding to the optical signal Ch4 at low bit rate, and similarly hereunder, the switching operation of each optical switch is set in sequence corresponding to the optical signals Ch5 to Chx at low bit rate.

Accordingly, the optical signals Ch1 to Chx c of each channel included in the WDM signal light pass through the demultiplexer 10 and the optical switches 11-1 to 11-2m, to be sent to the multiplexers 12-1 to 12-x corresponding to each channel number. Then, in the multiplexers 12-1 to 12-x, optical components sent from each of the optical switches are multiplexed to be output.

Here is a brief description of an operation of a multiplexing section having the first basic constitution shown in (B) of FIG. 1.

In the multiplexing section having the first basic constitution, as shown in the middle part of FIG. 2 for example, the optical signals Ch1 and Ch2 at high bit rate are input to demultiplexers 12-1 and 12-2 respectively, and the optical signals Ch3 to Chx at low bit rate are input to demultiplexers 12-3 to 12x respectively. In the demultiplexers 12-1 to 12-x, the input optical signals are branched into 2m components to be output to m×1 optical switches 11-1 to 11-2m. Each of the optical switches 11-1 to 11-2m has m input ports and one output port, and performs a switching operation so as to select one input port set in advance according to the wavelength arrangement of the optical signals Ch1 to Chx. To be specific, in each of the optical switches 11-1 to 11-4, an input port to receive light from the demultiplexer 12-1 is selected corresponding to the optical signal Ch1 at high bit rate, and in each of the optical switches 11-5 to 11-8, an input port to receive light from the demultiplexer 12-2 is selected corresponding to the optical signal Ch2 at high bit rate. Furthermore, in each of the optical switches 11-10 and 11-11, an input port to receive light from the demultiplexer 12-3 is selected corresponding to the optical signal Ch3 at low bit rate, in each of the optical switches 11-12 and 11-13, an input port to receive light from the demultiplexer 12-4 is selected corresponding to the optical signal Ch4 at low bit rate, and similarly hereunder, each optical switch performs a switching operation corresponding to the optical signals Ch5 to Chx at low bit rate. Then, a multiplexer 10 multiplexes each light from the optical switches 11-1 to 11-2m to output WDM signal light.

In this manner, according to the demultiplexing section or the multiplexing section having the first basic constitution, it is possible to demultiplex or multiplex the optical signals Ch1 to Chx of each channel while ensuring required bandwidth corresponding to each bit rate. Thus, it becomes possible to realize optical communication in which optical signals of low bit rate and optical signals of high bit rate are intermixed, without reducing signal accommodation efficiency.

Here, in the above first basic constitution, the optical switches 11-1 to 11-2m having m output ports (or input ports) have been used corresponding to the maximum number of m optical signals of low bit rate that can be accommodated. However, in the case where the wavelength arrangement of optical signals included in WDM signal light has regularity (for example, regularity that the optical signals are arranged sequentially from the shorter wavelength side in accordance with the channel number as mentioned above), since an output route range (or input route range) of each optical switch can be fixed, it is also possible to use optical switches with fewer ports.

Next is a description of a second basic constitution to be applied to the WDM optical communication system of the present invention.

Figure 4:
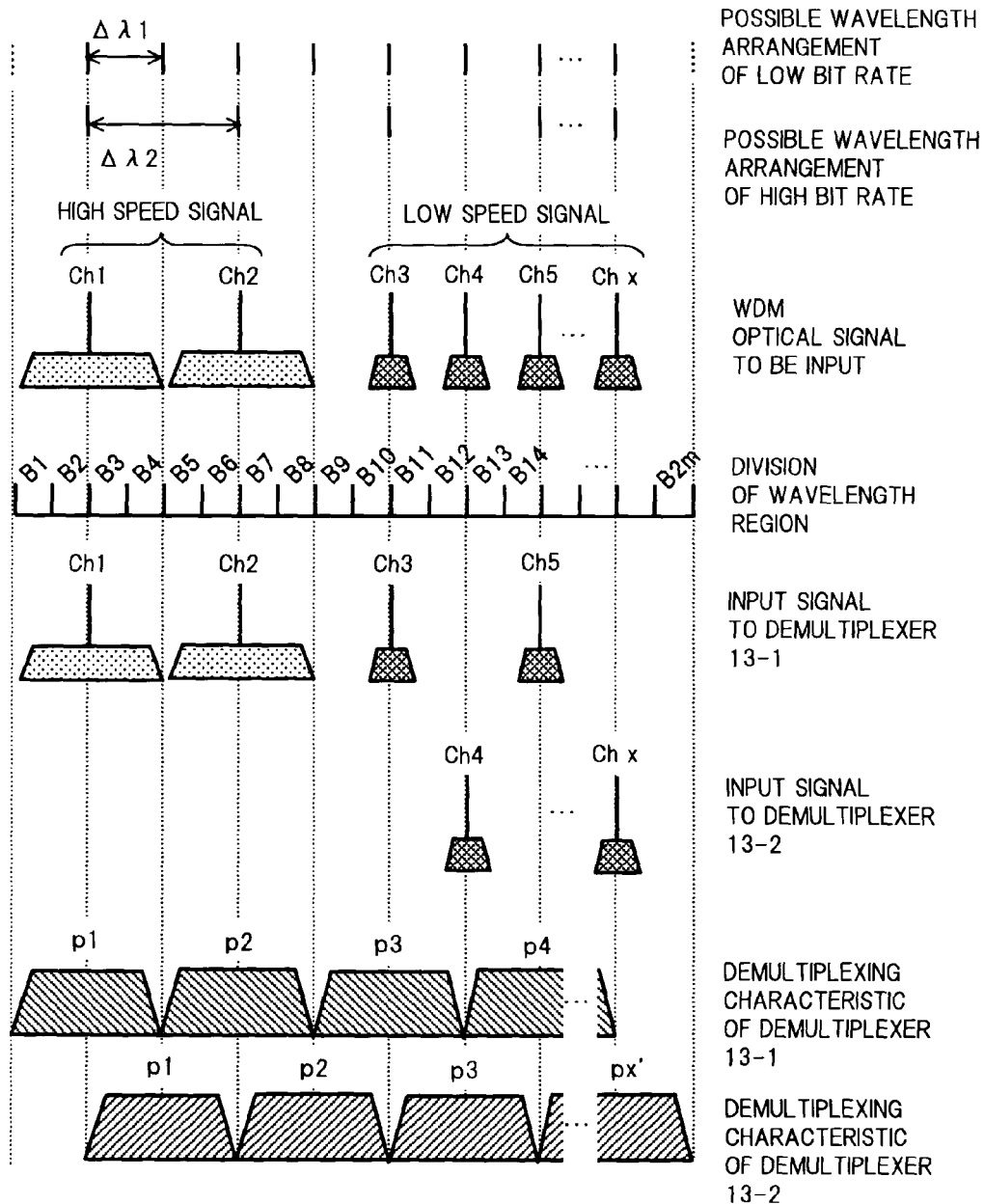
FIG. 4 shows an example of an assignment of wavelength regions and the like corresponding to the second basic constitution.

FIG. 3 is a block diagram showing the second basic constitution, in which (A) is a constitution of a demultiplexing section that demultiplexes an optical signal into individual wavelengths, and (B) is a constitution of a multiplexing section that multiplexes optical signals with respective wavelengths. Furthermore, FIG. 4 shows an example of an assignment of wavelength regions corresponding to the basic constitution of FIG. 3. Here, similarly to the case of the first basic constitution, only the constitution of the demultiplexing section will be described, and regarding the constitution of the multiplexing section, corresponding parts are denoted by the same symbols and the description thereof is omitted.

A basic constitution of the demultiplexing section shown in (A) of FIG. 3 is such that, in the first basic constitution as shown in (A) of FIG. 1, 1×R optical switches 11-1' to 11-2m' are used instead of the 1×m optical switches 11-1 to 11-2m, and there are provided R multiplexers 12-1 to 12-R (previous stage multiplexers), and also R demultiplexers 13-1 to 13-R (latter stage demultiplexers) each demultiplexing output light from each multiplexer 12-1 to 12-R. Here, as described above, R is an integer that expresses the ratio of the wavelength spacing $\Delta\lambda 2$ of the high bit rate and the wavelength spacing $\Delta\lambda 1$ of the low bit rate ($R=\Delta\lambda 2/\Delta\lambda 1$).

The 1×R optical switches 11-1' to 11-2m' are typical optical switches, each of which has one input port and R output ports, and switches light input to the input port from the demultiplexer 10 to be output from any one of the R output ports. For a specific 1×R optical switch, the MEMS switch as described above can be used for example. Furthermore, in the case of R=2, a liquid crystal shutter switch can also be used for a 1×2 optical switch. To be specific, it is possible to use a liquid crystal shutter switch as described in an article "Liquid crystal and grating-based multiple-wavelength cross-connect switch" by J. S. Patel and others, IEEE Photon. technol. lett., vol. 7, No. 5, May, 1995, and the like.

Each of the demultiplexers 13-1 to 13-R is a known optical filter having a demultiplexing characteristic that is changed periodically corresponding to the wavelength spacing $\Delta\lambda 2$, and having wavelength flatness sufficient to demultiplex the optical signal of high bit rate. Further, the demultiplexers 13-1 to 13-R are previously set such that center wavelengths of their filters differ from each other by the wavelength spacing $\Delta\lambda 1$. For specific demultiplexers 13-1 to 13-R, for example conventional optical filters using AWGs, film filters or the like can be used, and further the demultiplexers 13-1 to 13-R may be constituted by combining such conventional optical filters and interleavers.

Next is a description of an operation of the demultiplexing section using the second basic constitution as described above.

Here, as in the case of the first basic constitution, it is assumed that WDM signal light including optical signals Ch1 and Ch2 at high bit rate and optical signals Ch3 to Chx at low bit rate is input to a demultiplexer 10. Furthermore, the description will be made assuming the case where wavelength spacing $\Delta\lambda 2$ for high bit rate is 100 GHz, and wavelength spacing $\Delta\lambda 1$ for low bit rate is 50 GHz. In this case, $R=\Delta\lambda 2/\Delta\lambda 1=2$, so that it is possible to use 1×2 optical switches of small size (low number of output ports) as optical switches 11-1' to 11-2m'.

In the demultiplexer 10 to which the WDM signal light as described above is input, the WDM signal light is demultiplexed in accordance with wavelength regions B1 to B2m as shown in a middle part of FIG. 4, and optical components corresponding to the wavelength regions B1 to B2m are sent to the optical switches 11-1' to 11-2m' via output ports P1 to P2m respectively.

In each of the optical switches 11-1' to 11-2m', light sent to the input port from the demultiplexer 10 is output from one output port set in advance according to the wavelength arrangement of optical signals. Here, as shown in the middle part of FIG. 4, switching operations of the optical switches 11-1' to 11-8', 11-10', 11-11', 11-14', 11-15', . . . are set so as to select the output ports connected to the multiplexer 12-1 from R=2 output ports corresponding to the optical signals Ch1, Ch2, Ch3, Ch5, . . . (optical signals whose center wavelengths are shifted, respectively by 100 GHz spacing from the optical signal Ch1). Furthermore, switching operations of the optical switches 11-12', 11-13', . . . are set so as to select the output ports connected to the multiplexer 12-2 corresponding to the optical signals Ch4, . . . , Chx whose center wavelengths are shifted, respectively, by 50 GHz from the above-described optical signals Ch1, Ch2, Ch3, Ch5, . . . .

In this way, the WDM signal light passes through the demultiplexer 10 and the optical switches, thus the optical signals Ch1, Ch2, Ch3, Ch5, . . . are sent to the multiplexer 12-1, and the optical signals Ch4, . . . , Chx are sent to the multiplexer 12-2. Then, in the multiplexers 12-1 and 12-2, the optical components sent from each of the optical switches are multiplexed, to be output to the demultiplexers 13-1 and 13-2 respectively. A lower middle part of FIG. 4 shows optical signals input to the demultiplexers 13-1 and 13-2.

In each of the demultiplexers 13-1 and 13-2, output light from each of the multiplexers 12-1 and 12-2 is demultiplexed in accordance with a periodic demultiplexing characteristic as shown in a lower part of FIG. 4, to be output from corresponding output ports p1, p2, . . . . In the example of FIG. 4, the optical signals Ch1 and Ch2 at high bit rate are output respectively from the output parts p1 and p2 of the demultiplexer 13-1, and the optical signals Ch3, Ch5, . . . at low bit rate are output respectively from the output ports p3, p4, . . . of the demultiplexer 13-1. Furthermore, the optical signals Ch4, . . . , Chx at low bit rate are output respectively from the output ports p3, . . . px' of the demultiplexer 13-1.

Here, an operation of the multiplexing section having the second basic constitution as shown in (B) of FIG. 3 will also be described briefly.

In the multiplexing section having the second basic constitution, optical signals Ch1 and Ch2 at high bit rate, and optical signals Ch3, Ch5, . . . at low bit rate, are input to a multiplexer 13-1, and optical signals Ch4, . . . , Chx at low bit rate are input to a multiplexer 13-2. In each of the multiplexers 13-1 and 13-2, the input optical signals are multiplexed to be output to each of demultiplexers 12-1 and 12-2. In each of the demultiplexers 12-1 and 12-2, light from each of the multiplexers 13-1 and 13-2 is demultiplexed into 2m components to be output to R×1 (2×1 in the example of FIG. 4) optical switches 11-1' to 11-2m' respectively. Each of the optical switches 11-1' to 11-2m' has R=2 input ports and one output port, and performs a switching operation so as to select one input port set in advance according to the wavelength arrangement of the optical signals Ch1 to Chx. To be specific, the optical switches 11-1' to 11-8', 11-10', 11-11', 11-14', 11-15', . . . select input ports that receive light from the demultiplexer 12-1 corresponding to the optical signals Ch1, Ch2, Ch3, Ch5, . . . , and the optical switches 11-12', 11-13', . . . select input ports that receive light from the demultiplexer 12-2 corresponding to the optical signals Ch4, . . . Chx. Then, the multiplexer 10 multiplexes each light from the optical switches 11-1' to 11-2m', to output WDM signal light.

In this manner, according to the demultiplexing section or the multiplexing section having the second basic constitution, it is also possible to achieve a similar effect to the case of the first basic constitution, and it becomes possible to make the size of optical switch small (to reduce the number of input ports) corresponding to the ratio R of wavelength spacing for each bit rate.

Hereunder is the description of specific embodiments in cases where the basic constitution of the present invention as described above is applied to various apparatuses used in a WDM optical communication system.

Figure 5:
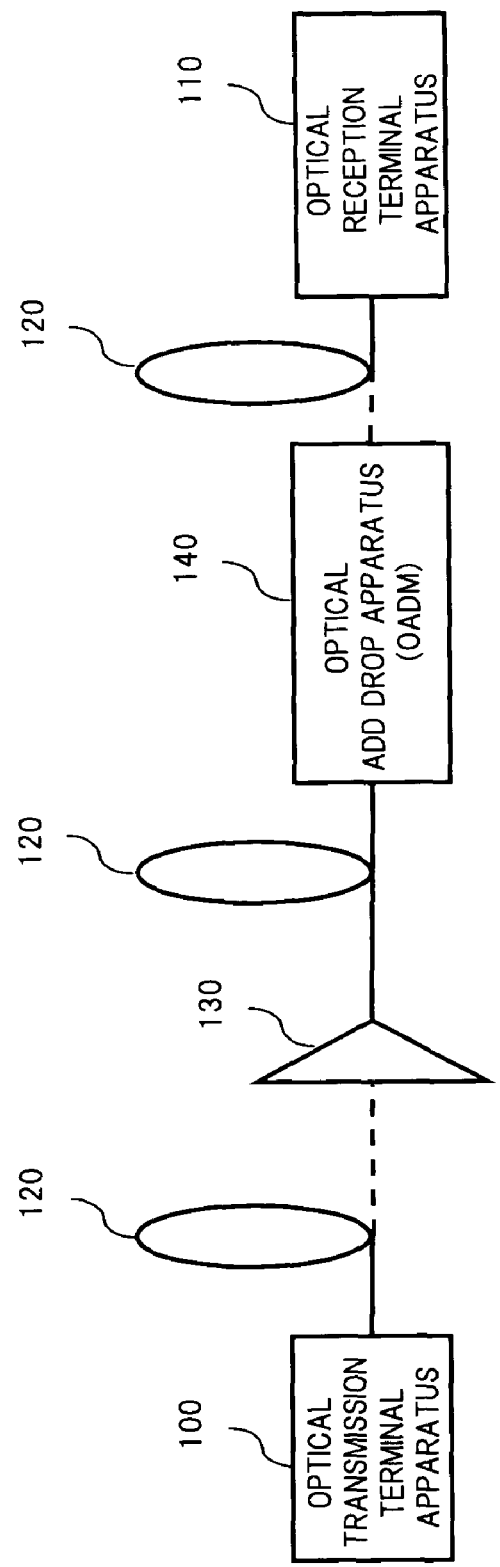
FIG. 5 is a block diagram showing an overall constitutional example of a WDM optical communication system to which the present invention is applied.

FIG. 5 is a block diagram showing an overall constitutional example of a WDM optical communication system to which the present invention is applied.

In the WDM optical communication system of FIG. 5, an optical transmission terminal apparatus 100 and an optical reception terminal apparatus 110 are connected by an optical transmission path 120, and an optical in-line amplifier 130 and an optical add drop apparatus (OADM) 140 are arranged on the optical transmission path 120. The basic constitution of the multiplexing section of the present invention as described above is applied to the optical transmission terminal apparatus 100, and the basic constitution of the demultiplexing section of the present invention as described above is applied to the reception terminal equipment 110. Furthermore, a combination of the basic constitutions of both the demultiplexing section and the multiplexing section of the present invention is applied to the optical add drop apparatus 140.

Figure 6:
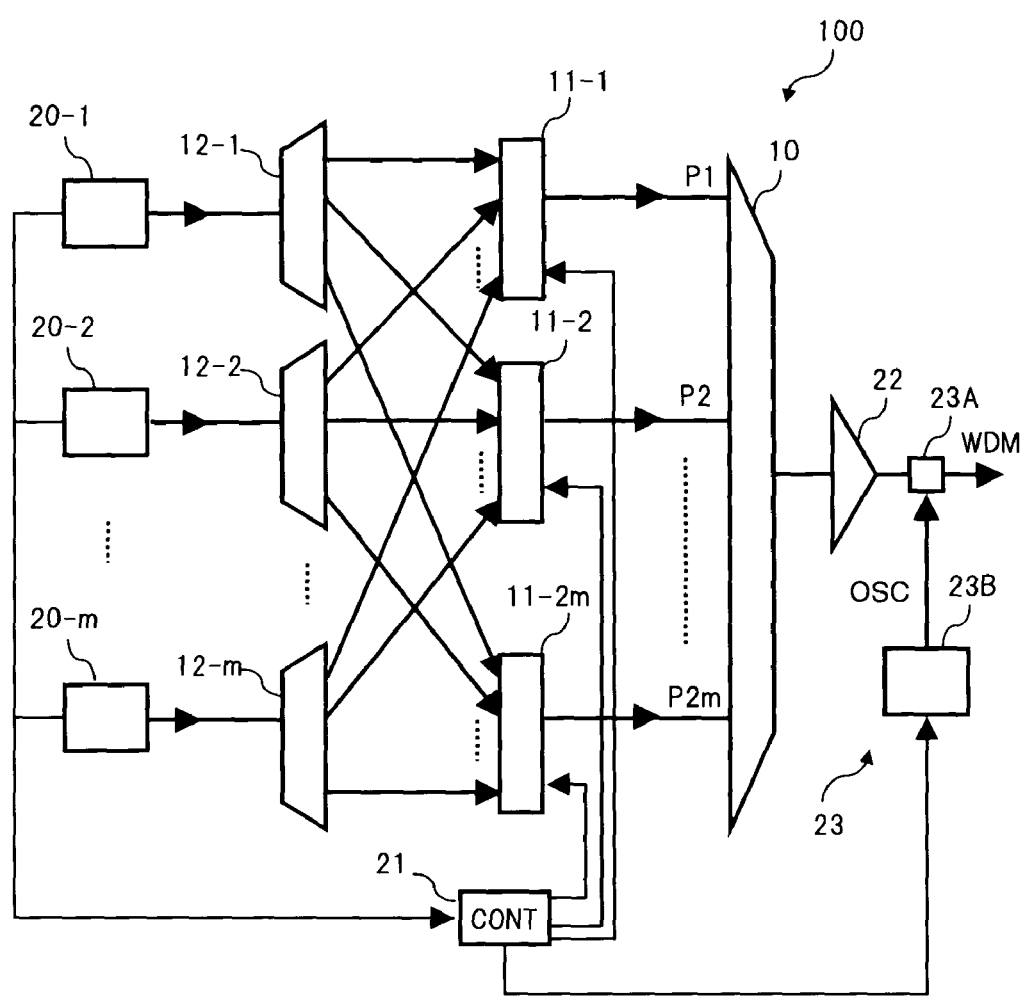
FIG. 6 is a constitutional diagram showing an embodiment of an optical transmission terminal apparatus to which the first basic constitution of the present invention is applied.

FIG. 6 is a constitutional diagram showing an embodiment of the optical transmission terminal apparatus to which the first basic constitution of the present invention is applied. Note, the components same as those in the basic constitution as described above are denoted by the same symbols, and the description thereof is omitted here, and similarly hereunder.

In FIG. 6, the optical transmission terminal apparatus 100 is provided with, for example, m optical senders 20-1, 20-2, . . . , 20-m, a control circuit (CONT) 21, an optical post amplifier 22, and a supervisory signal processing section 23, in the basic constitution of the multiplexing section as shown in (B) of FIG. 1.

The optical senders 20-1 to 20-m are known optical senders, which generate optical signals with wavelengths different from each other at required bit rate to transmit the optical signals to corresponding demultiplexers 12-1 to 12-m respectively. Further, each of the optical senders 20-1 to 20-m is provided with a function for generating transmission information related to bit rate, wavelength arrangement and the like of optical signal to be transmitted, to output the transmission information to the control circuit 21. Note, m being the number of optical senders installed is given by a value obtained by dividing the signal wavelength band ($\Delta\lambda T$) of the system by the wavelength spacing ($\Delta\lambda 1$) at the minimum bit rate supported by the system.

The control circuit 21 recognizes the bit rate, wavelength arrangement and the line of each optical signal based on the transmission information from the optical senders 20-1 to 20$m$, and according to the results, controls the switching operations of the m×1 optical switches 11-1 to 11-2m so as to ensure required bandwidth corresponding to each bit rate. These switching operations are controlled similarly to the setting of operations of the optical switches described in the first basic constitution.

The optical post amplifier 22 is a known optical amplifier that amplifies WDM signal light output from the multiplexer 10 to a required level to output it to the optical transmission path 120 (FIG. 5). This optical post amplifier 22 may be disposed as required, and it can be omitted in the case where the WDM signal light output from the multiplexer 10 is at a sufficient level.

The supervisory signal processing section 23 comprises an OSC optical sender 23B that generates a supervisory signal (OSC) to be transmitted to a downstream apparatus according to output information from the control circuit 21, and a multiplexer 23A that multiplexes the supervisory signal from the OSC optical sender 23B and the WDM signal light output from the optical post amplifier 22. Here, the control circuit 21 transmits information of bit rate, wavelength arrangement and the like for each optical signal included in the WDM signal light to the downstream apparatus through the supervisory signal.

In the optical transmission terminal apparatus 100 of the above-described constitution, when the optical signals generated in the optical senders 20-1 to 20-m are input to the corresponding demultiplexers 12-1 to 12-m, optical signals with respective wavelengths are multiplexed, in a state of ensuring the required bandwidth corresponding to each bit rate, by the same operation as in the case of the above-described multiplexing section having the first basic constitution, to be output from the multiplexer 10. Then, the WDM signal light output from the multiplexer 10 is transmitted to the optical transmission path 120 after having been batch amplified by the optical post amplifier 22.

In this manner, according to the present optical transmission terminal apparatus 100, it becomes possible to transmit WDM signal light in which the wavelengths of optical signals of different bit rates are arranged efficiently to the optical transmission path.

Figure 7:
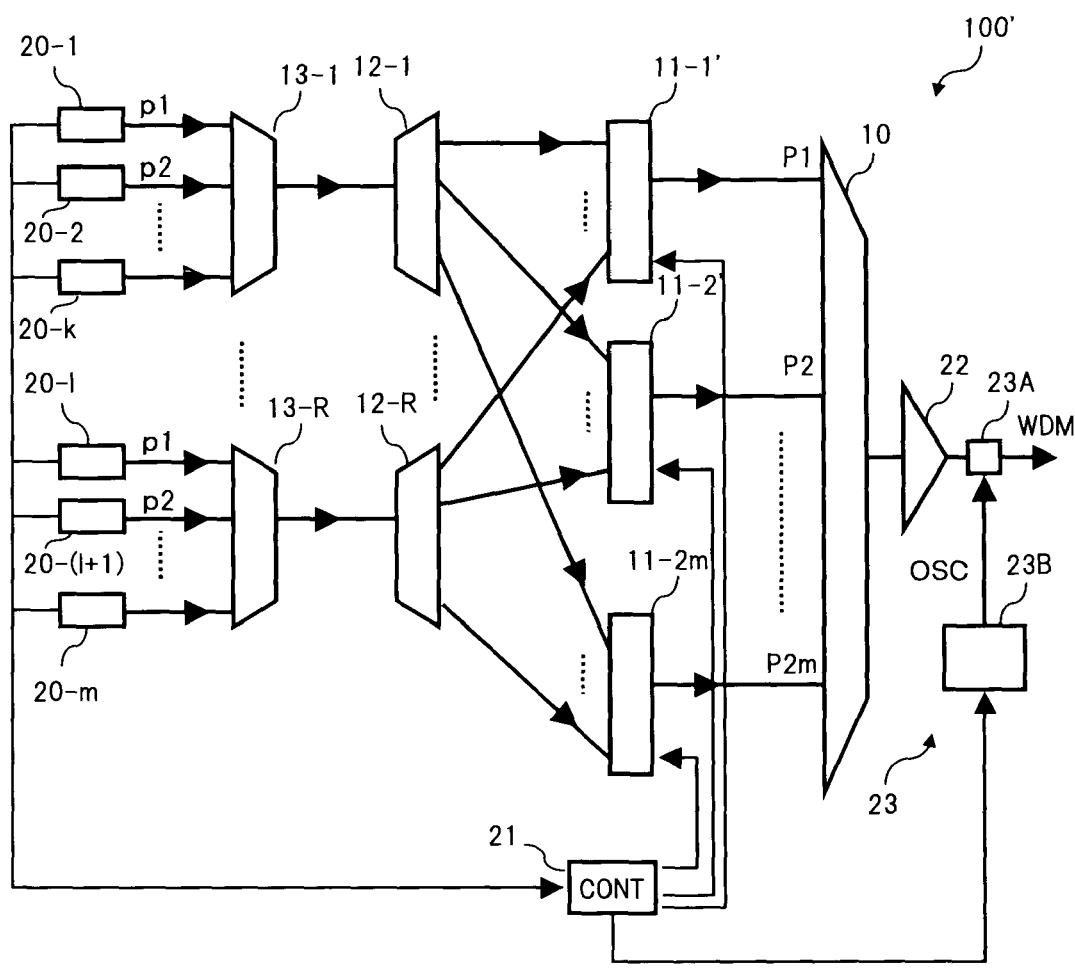
FIG. 7 is a constitutional diagram showing an embodiment of an optical transmission terminal apparatus to which the second basic constitution of the present invention is applied.

FIG. 7 is a constitutional diagram showing an embodiment of the optical transmission terminal apparatus to which the second basic constitution of the present invention is applied.

In FIG. 7, an optical transmission terminal apparatus 100' is provided with, for example, m optical senders 20-1 to 20-m, a control circuit (CONT) 21, an optical post amplifier 22, and a supervisory signal processing section 23, in the basic constitution of the multiplexing section as shown in (B) of FIG. 3.

Constitutions of the optical senders 20-1 to 20-m, the control circuit 21, the optical post amplifier 22 and the supervisory signal processing section 23 are the same as those used for the optical transmission terminal apparatus 100 as shown in FIG. 6. Here however, the optical signals generated in the optical senders 20-1 to 20-k are transmitted to the multiplexer 13-1, and the optical signals generated in the optical senders 20-1 to 20-m are transmitted to the multiplexer 13-R (k<l<m). Furthermore, a switching control by the control circuit 21 is performed similarly to the operation setting of the optical switches as described in the second basic constitution.

In the optical transmission terminal apparatus 100' of the above-described constitutions, when the optical signals generated in the optical senders 20-1 to 20-m are input to the corresponding demultiplexers 12-1 to 12-R, optical signals with respective wavelengths are multiplexed, in a state of ensuring the required bandwidth corresponding to each bit rate, by the same operation as in the case of the above-described multiplexing section having the first basic constitution, to be output from the multiplexer 10. Then, the WDM signal light output from the multiplexer 10 is transmitted to the optical transmission path 120 after having been batch amplified by the optical post amplifier 22.

Here, for a specific example of the optical transmission terminal apparatus 100', there will be described a case where optical signals of low bit rate (for example, 2.5 Gb/s, etc.) arranged at wavelength spacing of 25 GHz, and optical signals of high bit rate (for example, 40 Gb/s, etc.) arranged at wavelength spacing of 100 GHz, are intermixed. In this case, since the integer R, which expresses the ratio of the wavelength spacing of high bit rate and the wavelength spacing of low bit rate, is 100 GHz/25 GHz=4, four multiplexers 13-1 to 13-4 and four demultiplexers 12-1 to 12-4 are disposed.

Figure 8:
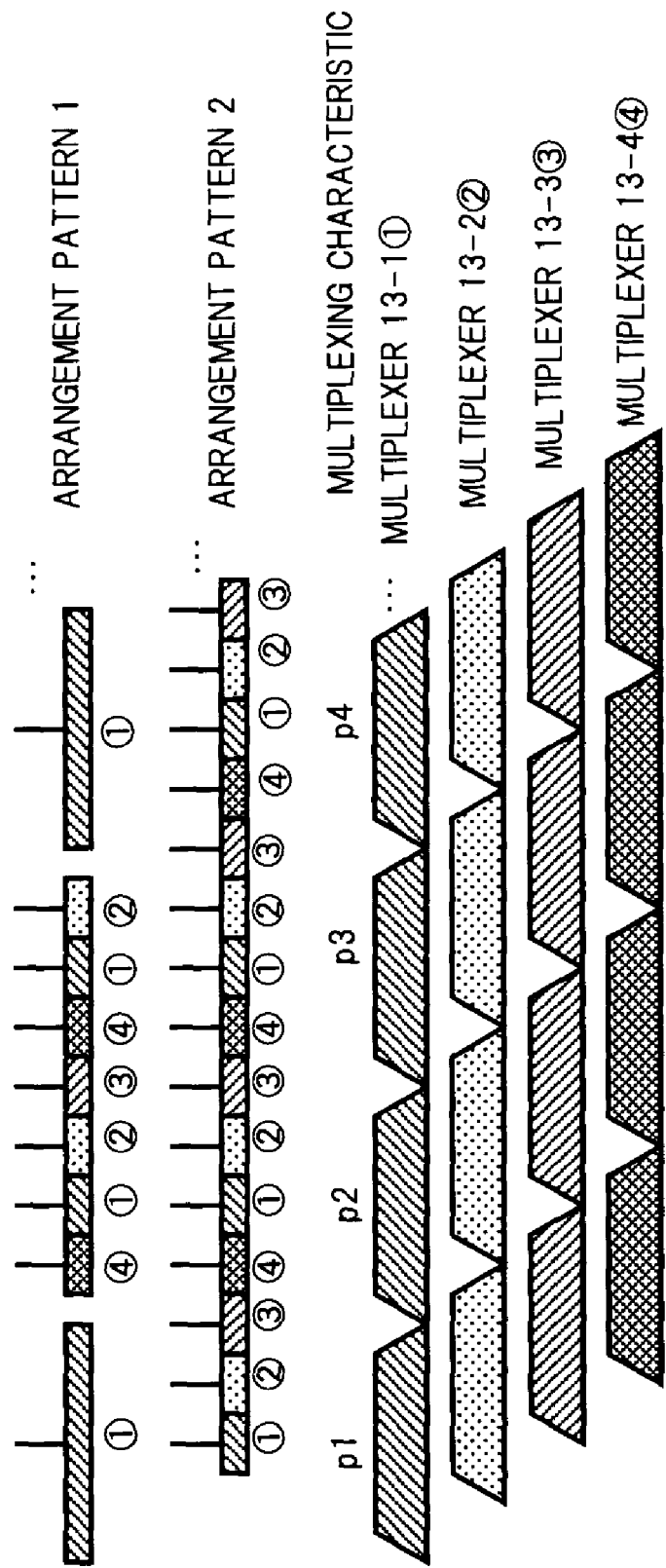
FIG. 8 is a diagram explaining an operation of the optical transmission terminal apparatus of FIG. 7, which shows a wavelength arrangement pattern of each optical signal and a multiplexing characteristic of each multiplexer.

FIG. 8 shows wavelength arrangement patterns of the optical signals and the multiplexing characteristic of each of the multiplexers 13-1 to 13-4 in the above case.

An arrangement pattern 1 as shown at an upper most part of FIG. 8 is an example of a wavelength arrangement in which optical signals of high bit rate are input to one multiplexer 13-1 so that optical signals of low bit rate follow successively. Note, the numerals shown at lower parts corresponding to the arrangement patterns indicate the multiplexers 13-1 to 13-4 to which optical signals are input, respectively. In the case of this arrangement pattern 1, for the high bit rate, the optical signal on the shorter wavelength side is input to an input port p1 of the multiplexer 13-1, and the optical signal on the longer wavelength side is input to an input port p4 of the multiplexer 13-1. Further, for the low bit rate, the optical signal with the shortest wavelength is input to an input port p1 of the multiplexer 13-4, the optical signal with the second shortest wavelength is input to an input port p2 of the multiplexer 13-1, the optical signal with the third shortest wavelength is input to an input port p2 of the multiplexer 13-2, the optical signal with the fourth shortest wavelength is input to an input port p2 of the multiplexer 13-3, and similarly hereunder, optical signals with each wavelength are input to each of the multiplexers 13-1 to 13-4 in rotation.

Furthermore, an arrangement pattern 2 is an example of a wavelength arrangement such that only optical signals of low bit rate follow successively. In the case of this arrangement pattern 2, the optical signal with the shortest wavelength is input to the input port p1 of the multiplexer 13-1, the optical signal with the second shortest wavelength is input to an input port p1 of the multiplexer 13-2, the optical signal with the third shortest wavelength is input to an input port p1 of the multiplexer 13-3, the optical signal with the fourth shortest wavelength is input to the input port p1 of the multiplexer 13-4, and similarly hereunder, optical signals of each wavelength are input to each of the multiplexers 13-1 to 13-4 in rotation.

In this manner, according to the present optical transmission terminal apparatus 100', it becomes also possible to transmit WDM signal light in which the wavelengths of optical signals of different bit rates are arranged efficiently on the optical transmission path. Further, it is possible to use optical switches with fewer input ports, thus enabling apparatus to be miniaturized.

Note, for the above-described optical transmission terminal apparatuses 100 and 100', in order to avoid an influence of crosstalk at a time when multiplexing optical signals, for example, optical band pass filters each having a center wavelength coincident with the wavelength of each of optical senders 20-1 to 20-m and having bandwidth corresponding to each bit rate may be inserted between the optical senders 20-1 to 20-m, and the demultiplexers 12-1 to 12-m or the input ports of the multiplexers 13-1 to 13-R. Further, a variable optical attenuator may be disposed on the output side of each of the optical senders 20-1 to 20-m to adjust the level of transmitted light of each wavelength.

Here is a description of a modified example of the optical transmission terminal apparatus 100' to which the second basic constitution described above is applied.

Figure 9:
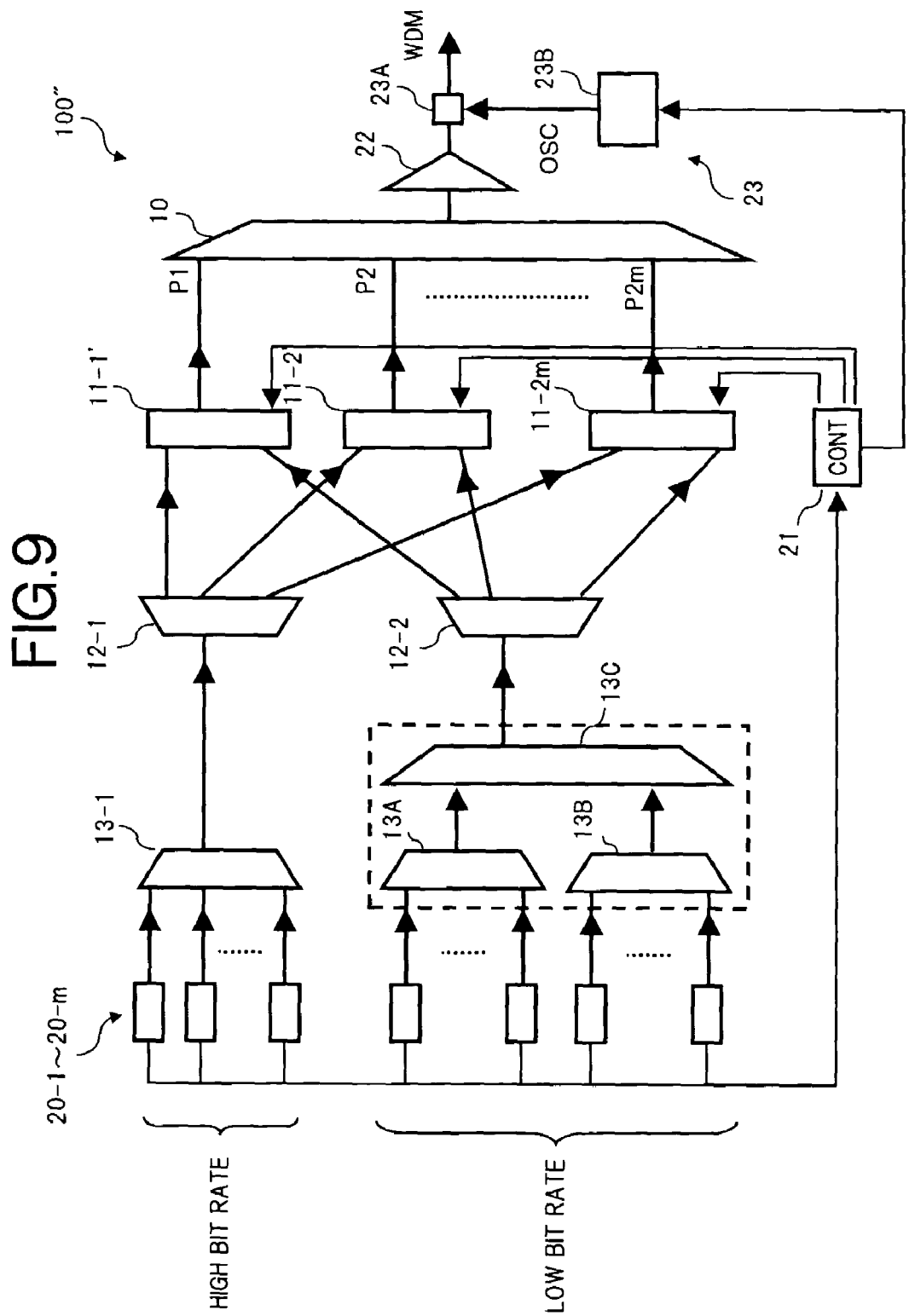
FIG. 9 is a constitutional diagram showing a modified example of the optical transmission terminal apparatus to which the second basic constitution of the present invention is applied.

FIG. 9 is a block diagram showing a constitution of the modified example described above.

In FIG. 9, an optical transmission terminal apparatus 100" is constituted such that, in the optical transmission terminal apparatus 100', the optical senders 20-1 to 20-m are divided into ones for high bit rate and the remains for low bit rate, so that optical signals output from the optical senders for high bit rate are multiplexed by the multiplexer 13-1 to be sent to the demultiplexer 12-1, and optical signals output from the optical senders for low bit rate are multiplexed by multiplexers 13A and 13B and an interleaver 13C to be sent to the demultiplexer 12-2. Other than the above, the constitution is similar to the constitution of the optical transmission terminal apparatus 100' as shown in FIG. 7. Note, it is assumed that for example, the high bit rate is 40 Gb/s (wavelength spacing of 100 GHz), and the low bit rate is 10 Gb/s (wavelength spacing of 50 GHz).

For each of the multiplexer 13-1 on the high bit rate side, and the multiplexers 13A and 13B on the low bit rate side, there is used a known optical filter having a multiplexing characteristic that is changed periodically corresponding to the wavelength spacing 100 GHz, and having sufficient wavelength flatness. Further, the multiplexers 13A and 13B are previously set such that the center wavelengths of the filters differ by 50 GHz from each other. For such a multiplexer, it is possible to use a typical optical filter utilizing an AWG, a film filter or the like, for example. The interleaver 13C is a known optical filter, that multiplexes the optical signals at spacing of 100 GHz output from both of the multiplexers 13A and 13B, to generate optical signals at spacing of 50 GHz.

In such an optical transmission terminal apparatus 100", optical signals with respective wavelengths are multiplexed for each bit rate, and for optical signals of low bit rate at narrow wavelength spacing, the multiplexing is performed by a combination of the multiplexers 13A and 13B, and the interleaver 13C. Then, similarly to the case of the optical transmission terminal apparatus 100' as described above, WDM signal light in which the optical signals of high bit rate and the optical signals of low bit rate are intermixed is generated to be transmitted to the optical transmission path. Accordingly, in the constitution of the present optical transmission terminal apparatus 100", it is also possible to achieve an effect similar to that in the optical transmission terminal apparatus 100'.

Next, there will be described embodiments of the optical reception terminal apparatus to which each basic constitution of the present invention is applied.

Figure 10:
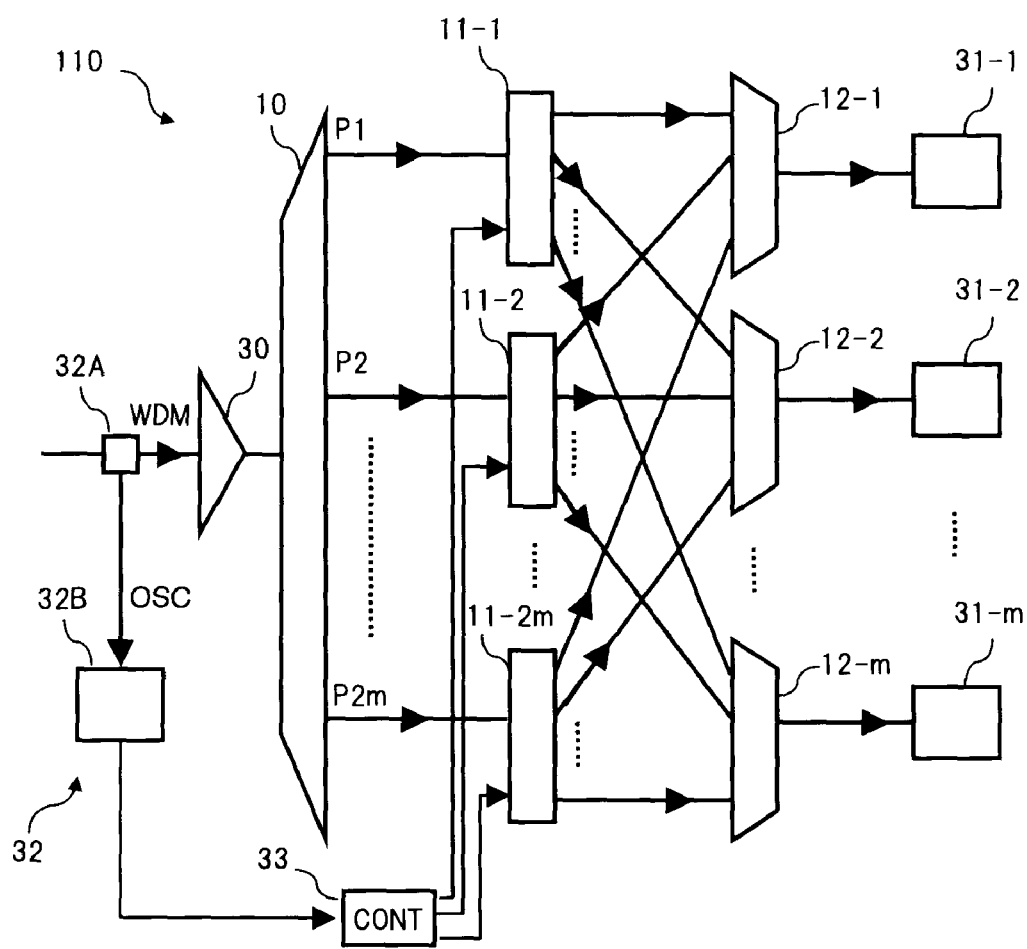
FIG. 10 is a constitutional diagram showing an embodiment of an optical reception terminal apparatus to which the first basic constitution of the present invention is applied.

FIG. 10 is a constitutional diagram showing an embodiment of the optical reception terminal apparatus to which the first basic constitution of the present invention is applied.

In FIG. 10, an optical reception terminal apparatus 110 is provided with, for example, an optical preamplifier 30, m optical receivers 31-1, 31-2, . . . , 31-m, a supervisory (OSC) signal processing section 32 and a control circuit (CONT) 33, in the basic constitution of the demultiplexing section as shown in (A) of FIG. 1.

The optical preamplifier 30 is a known amplifier that amplifies WDM signal light sent from the optical transmission path 120 (FIG. E) to a required level, to output to the demultiplexer 10. The optical receivers 31-1 to 31-m are known optical receivers that can receive to process optical signals output from the multiplexers 12-1 to 12-m connected thereto. Note, m (maximum value) being the number of optical receivers installed is given by the value obtained by dividing the signal wavelength band (ΔλT) of the system by the wavelength spacing (Δλ1) at the minimum bit rate supported by the system.

The OSC signal processing section 32 includes a demultiplexer 32A that demultiplexes a supervisory signal transmitted along with WDM signal light sent from the optical transmission path 120 for example, and an OSC optical receiver 32B that receives the demultiplexed supervisory signal and identifies transmission information indicated by the supervisory signal.

The control circuit 33 recognizes the bit rate, wavelength arrangement and the like of each optical signal included in the received WDM signal light based on the transmission information identified by the OSC optical receiver 32B, and according to the results, controls the switching operations of the 1×m optical switches 11-1 to 11-2m so as to ensure the required bandwidth corresponding to each bit rate. These switching operations are controlled similarly to the setting of operations of the optical switches described in the first basic constitution.

In the optical reception terminal apparatus 110 of the above-described constitution, when the WDM signal light from the optical transmission path 120 passes through the demultiplexer 32A to be input to the optical preamplifier 30, the WDM signal light is sent to the demultiplexer 10 after being amplified to the required level. Further, at the same time, the supervisory signal transmitted from the transmission terminal side along with the WDM optimal signal is demultiplexed by the demultiplexer 32A, to be sent to the OSC optical receiver 32B where the transmission information related to the bit rate, wavelength arrangement and the like of each optical signal included in the WDM signal light is identified. This transmission information is transmitted to the control circuit 33 where the switching operations of the optical switches 11-1 to 11-2m are controlled in accordance with the transmission information.

The WDM signal light input to the demultiplexer 10 is demultiplexed in a state of ensuring required bandwidth of the optical signals of each wavelength corresponding to each bit rate by the same operation as in the case of the above-described demultiplexing section having the first basic constitution, to be output from the corresponding multiplexers 12-1 to 12-m. Then, the optical signals output from the multiplexers 12-1 to 12-m are sent to corresponding optical receivers 31-1 to 31-m, to be processed.

In this manner, according to the present optical reception terminal apparatus 110, it becomes possible to demultiplex reliably WDM signal light including optical signals of different bit rates for reception processing, while ensuring the required bandwidth corresponding to each bit rate.

Figure 11:
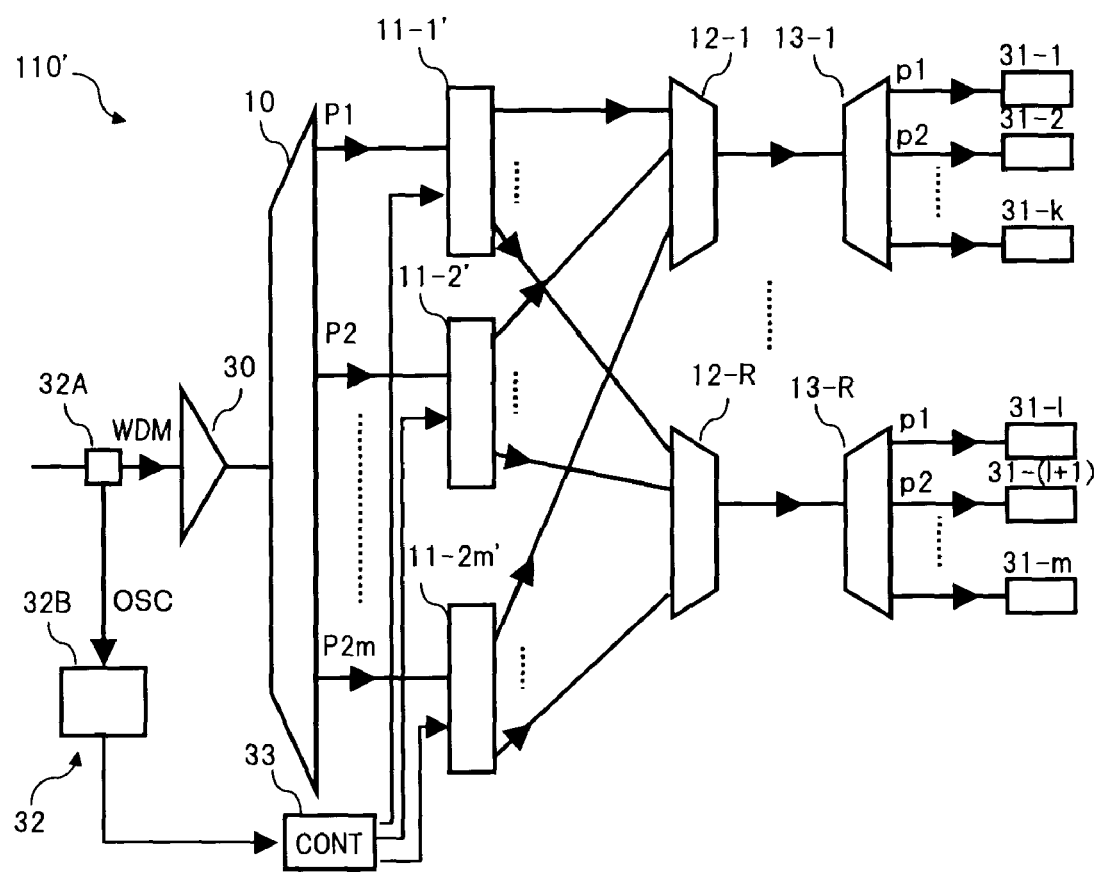
FIG. 11 is a constitutional diagram showing an embodiment of an optical reception terminal apparatus to which the second basic constitution of the present invention is applied.

FIG. 11 is a constitutional diagram showing an embodiment of the optical reception terminal apparatus having the second basic constitution of the present invention.

In FIG. 11, an optical transmission terminal apparatus 110' is provided with, for example, an optical preamplifier 30, m optical receivers 31-1, 31-2, . . . , 31-m, a supervisory (OSC) signal processing section 32 and a control circuit (CONT) 33, in the basic constitution of the demultiplexing section as shown in (A) of FIG. 3.

Constitutions of the optical preamplifier 30, the optical receivers 31-1, 31-2, . . . 31-m, the supervisory (OSC) signal processing section 32 and the control circuit (CONT) 33 are the same as those used for the optical reception terminal apparatus 110 as shown in FIG. 10. Here however, the optical signals demultiplexed by the demultiplexer 13-1 are sent to the optical receivers 31-1 to 31-k, and the optical signals demultiplexed by the demultiplexer 13-R are sent to the optical receivers 31-1 to 31-m (k<1<m). Further, a switching control by the control circuit 33 is performed similarly to the setting of operations of the optical switches as described in the second basic constitution.

In the optical transmission terminal apparatus 110' of the above-described constitution, the WDM signal light from the optical transmission path 120 is sent to the demultiplexer 10 via the demultiplexer 32A and the optical preamplifier 30, and also the supervisory signal transmitted along with the WDM signal light is sent to the OSC optical receiver 32B via the demultiplexer 32A where the transmission information is identified, and the switching operations of the optical switches 11-1' to 11-2m' are controlled by the control circuit 33.

The WDM signal light input to the demultiplexer 10 is demultiplexed in a state of ensuring required bandwidth of the optical signals of each wavelength corresponding to each bit rate by the same operation as in the case of the above-described demultiplexing section having the second basic constitution, to be output from the demultiplexers 13-1 to 13-R. Then, the optical signals output from the demultiplexers 13-1 to 13-R are sent to the corresponding optical receivers 31-1 to 31-m, to be processed.

In this manner, according to the present optical reception terminal apparatus 110', it becomes also possible to demultiplex reliably WDM signal light including optical signals of different bit rates for reception processing, while ensuring the required bandwidth corresponding to each bit rate.

Here, there will be described a modified example of the optical reception terminal apparatus 110' having the second basic constitution described above.

Figure 12:
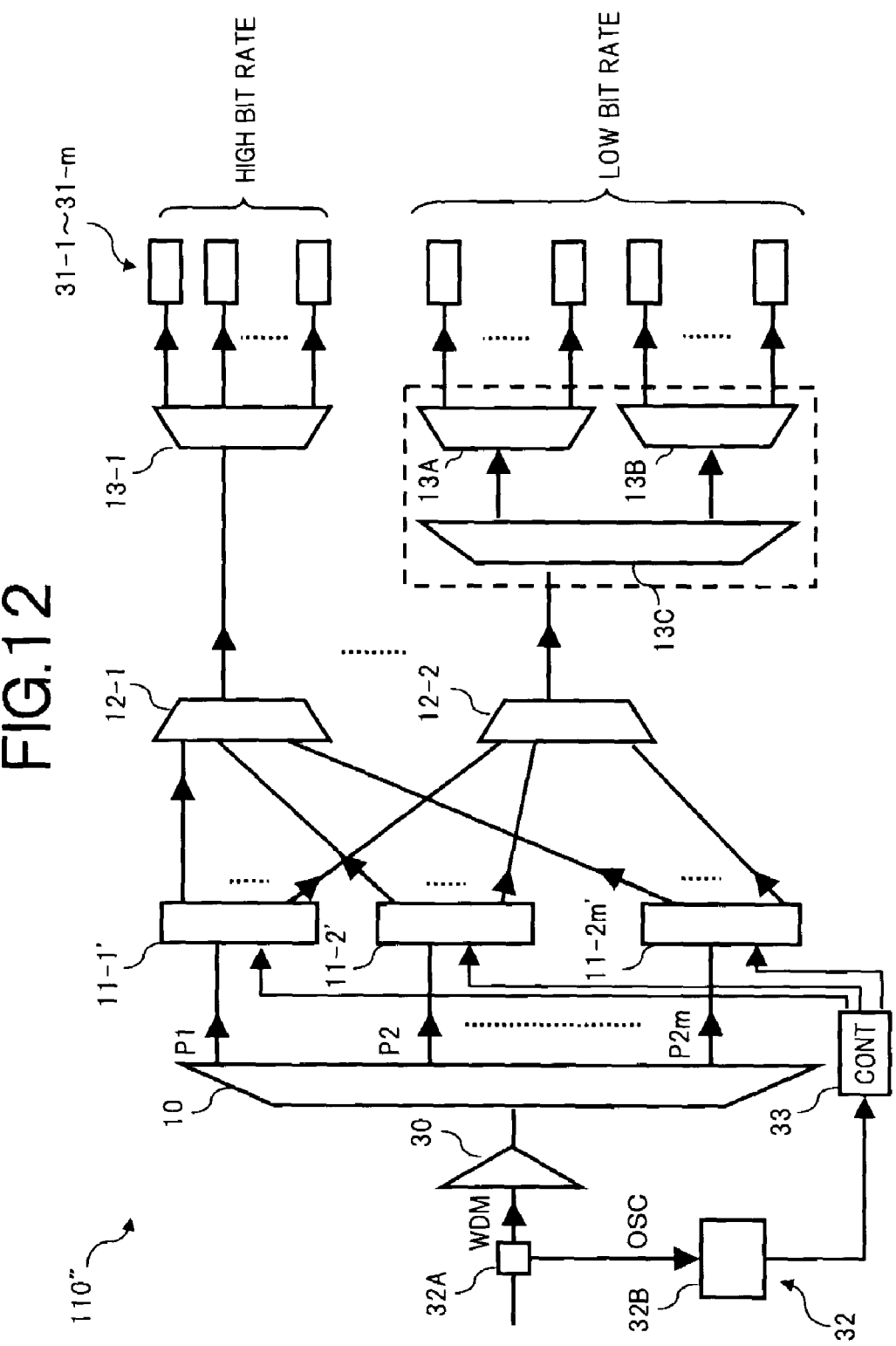
FIG. 12 is a constitutional diagram showing a modified example of the optical reception terminal apparatus to which the second basic constitution of the present invention is applied.

FIG. 12 is a block diagram showing a constitution of the modified example described above.

In FIG. 12, an optical reception terminal apparatus 110" is constituted such that, in the optic reception terminal apparatus 110', the optical receivers 31-1 to 31-m are divided into ones for high bit rate and the remains for low bit rate, so that the optical signals output from the demultiplexer 13-1 are sent to the optical receivers for high bit rates, and the optical signals output from the multiplexer 12-2 are demultiplexed by the interleaver 13C and the demultiplexers 13A and 13B to be sent to me optical senders for low bit rates. Other than the above, the constitution is similar to the constitution of the optical reception terminal apparatus 110' as shown in FIG. 11. Here, for example, the high bit rate is 40 Gb/s (wavelength spacing of 100 GHz), and the low bit rate is 10 Gb/s (wavelength spacing of 50 GHz).

For each of the demultiplexer 13-1 on the high bit rate side and the demultiplexers 13A and 13B on the low bit rate side, there is used a known optical filter having a demultiplexing characteristic that is changed periodically corresponding to the wavelength spacing 100 GHz, and having sufficient wavelength flatness. Further, the demultiplexers 13A and 13B are previously set such that the center wavelengths of the fillers differ by 50 GHz from each other. For such a demultiplexer, it is possible to use a typical optical filter utilizing an AWG, a film filter or the like, for example. The interleaver 13C is a known optical filter that demultiplexes the optical signals at spacing of 50 GHz output from both of the multiplexer 12-2, to generate a group of optical signal at spacing of 100 GHz.

In such an optical reception terminal apparatus 110", WDM signal right is batch demultiplexed for each bit rate, and for optical signals at low bit rate at narrow wavelength spacing, the demultiplexing is performed by a combination of the interleaver 13C, and the demultiplexers 13A and 13B. As a result, similarly to the case of the optical reception terminal apparatus 110' as described above, the reception processing is performed reliably on optical signals with each wavelength included in the WDM signal light in which the optical signals of high bit rate and the optical signals of low bit rate are intermixed. Accordingly, in the constitution of the present optical reception terminal apparatus 110", it is also possible to achieve an effect similar to that of the optical reception terminal apparatus 110'.

Next is a description of an embodiment of an optical add drop apparatus to which the basic constitution of the present invention is applied.

Figure 13:
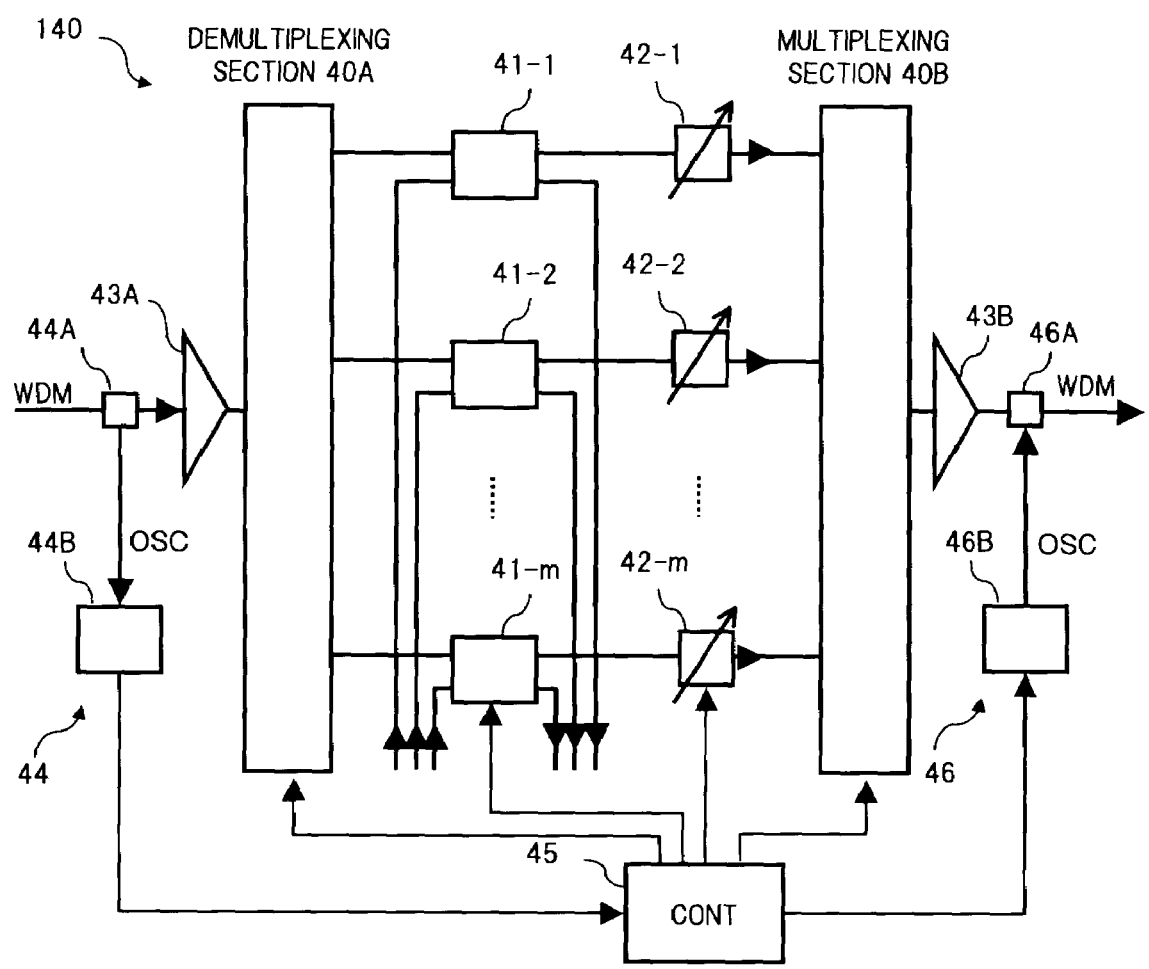
FIG. 13 is a constitutional diagram showing an embodiment of an optical add drop apparatus to which a basic constitution of the present invention is applied.

FIG. 13 is a constitutional diagram showing an embodiment of the optical add drop apparatus to which the basic constitution of the present invention is applied.

In FIG. 13, an optical add drop apparatus 140 is constituted by combining a demultiplexing section 40A having the basic constitution of the present invention as shown in (A) of FIG. 1 or (A) of FIG. 3, and a multiplexing section 40B having the basic constitution of the present invention as shown in (B) of FIG. 1 or (B) of FIG. 3. WDM signal light sent from the optical transmission path 120 (FIG. 5) is input to the demultiplexing section 40A via an optical preamplifier 43A, and the optical signals demultiplexed by the demultiplexing section 40A are sent to corresponding 2×2 optical switches 41-1 to 41-m. The optical signals of each wavelength passed through variable optical attenuators 42-1 to 42-m are input to the multiplexing section 40B, and the WDM signal light multiplexed in the multiplexing section 40B is sent again to the optical transmission path 120 via an optical preamplifier 43B. Further, supervisory signal processing sections 44 and 46 are disposed on a previous stage of the optical preamplifier 43A and a latter stage of the optical preamplifier 43B respectively, and a control circuit (CONT) 45 is disposed to control the operation setting of each of the demultiplexing section 40A, the multiplexing section 40B and the variable optical attenuators 42-1 to 42-m in accordance with the transmission information identified by tile supervisory signal processing section 44.

Each of the 2×2 optical switches 41-1 to 41-m has two input ports and two output ports, where the optical signal output from the demultiplexing section 40A is input to one of the input ports, and the optical signals added at the present node is input to the other input port. Further, the optical signal to be sent to each of corresponding variable optical attenuators 42-1 to 42-m is output from one output port, and the optical signal to be dropped at the present node is output from the other output port. A switching operation of each switch is controlled in accordance with a signal from the control circuit 45. Note, FIG. 13 shows that the signal from the control circuit 45 is only input to the 2×2 optical switch 41-m. However, the signal from the control circuit 45 is also input to each of the other 2×2 optical switches similarly.

Each of the variable optical attenuators 42-1 to 42-m is for adjusting the level of the optical signal output from each of the 2×2 optical switches 41-1 to 41-m, and an optical attenuation thereof is controlled in accordance with the signal from the control circuit 45. FIG. 13 shows that the signal from the control circuit 45 is only input to the variable apical attenuator 42-m. However, the signal from the control circuit 45 is also input to each of the other variable optical attenuators similarly.

The supervisory signal processing section 44 includes a demultiplexer 44A that demultiplexes a supervisory signal transmitted along with WDM signal light from the optical transmission path 120, and an OSC optical receiver 44B that receives the demultiplexed supervisory signals to identify the transmission information indicated by the supervisory signals, and transmits the transmission information identified by the OSC optical receiver 44B to the control circuit 45. Further, the supervisory signal processing section 46 includes an OSC optical sender 46B that generates a supervisory signal to be transmitted to the optical reception terminal side according to the transmission information sent from the control circuit 45, and a multiplexer 46A that multiplexes the supervisory signal from the OSC optical sender 46B with the WDM signal light output from the optical preamplifier 43.

The control circuit 45 recognizes the bit rate, wavelength arrangement and the like of each optical signal included in the received WDM signal light based on the transmission information from the OSC optical receiver 44B, and also recognizes the bit rate, wavelength arrangement and the like of the optical signal added or dropped at the present node, to generate control signals for controlling the setting of operations of the optical switches of the demultiplexing section 40A and the multiplexing section 40B, and the setting of the optical attenuation of each of the variable optical attenuators 42-1 to 42-m.

Figure 14:
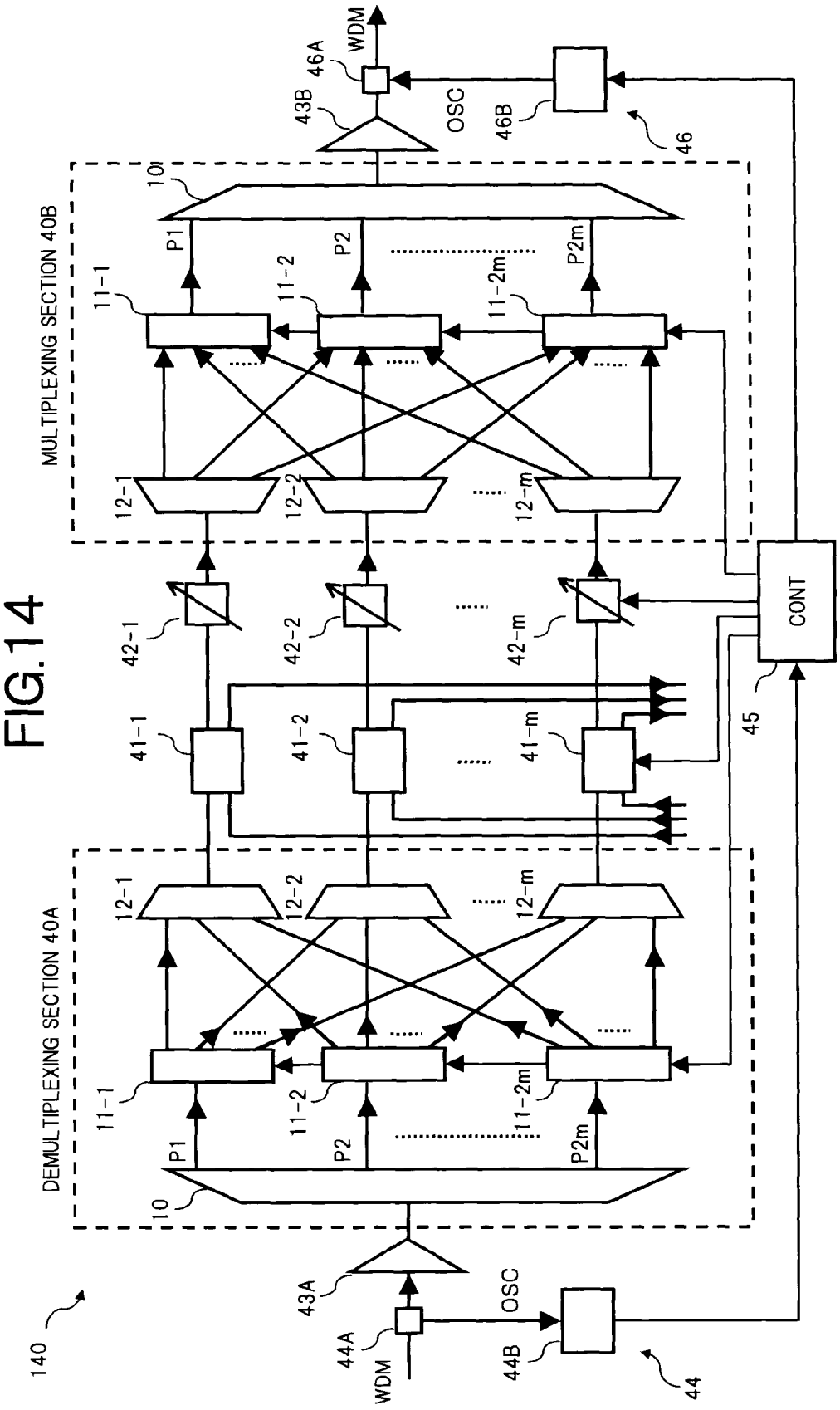
FIG. 14 is a specific constitutional diagram of the optical add drop apparatus of FIG. 13 in a case where the first basic constitution of FIG. 1 is applied.

Here, as a specific example of the above-described optical add drop apparatus 140, FIG. 14 shows a constitution in the case where the first basic constitution shown in FIG. 1 is applied to the demultiplexing section 40A and the multiplexing section 40B. In the specific constitution of FIG. 14, the output port of each of the multiplexers 12-1 to 12-m in the demultiplexing section 40A is connected to the input port of each of the 2×2 optical switches 41-1 to 41-m, and an output terminal of each of the variable optical attenuators 42-1 to 42-m is connected to the input port of each of the demultiplexers 12-1 to 12-m in the multiplexing section 40B.

Note, for the specific constitution of each of the demultiplexing section 40A and the multiplexing section 40B, a case is shown in which the first basic constitution is applied. However, needless to say, the second basic constitution shown in FIG. 3 may be applied to the demultiplexing section 40A and the multiplexing section 40B. Further, it is also possible to apply the modified constitution of the second basic constitution as shown in FIG. 9 and FIG. 12 to the demultiplexing section 40A and the multiplexing section 40B.

In the optical add drop apparatus 140 as described above, when the WDM signal light from the optical transmission path 120 passes through the demultiplexer 44A to be input to the optical preamplifier 30, the WDM signal light is sent to the demultiplexing section 40A after being amplified to a required level. Further, at the same time, a supervisory signal transmitted from the transmission terminal side along with the WDM optimal signal is demultiplexed by the demultiplexer 44A to be sent to the OSC optical receiver 44B, where the transmission information of each optical signal included in the WDM signal light is identified to be transmitted to the control circuit 45. The control circuit 45 controls the switching operations of the optical switches in the demultiplexing section 40A in accordance with the transmission information from the OSC optical receiver 44B, and also the switching operations of the switches in the multiplexing section 40B in accordance with the information added with bit rates, wavelength arrangement and the like of opt signal added or dropped at the present node.

The WDM signal light input to the demultiplexing section 40A is demultiplexed in a state of ensuring required bandwidth of optical signals with each wavelength corresponding to each bit rate, and the demultiplexed optical signals are output from the corresponding multiplexers 12-1 to 12-m to the 2×2 optical switches 41-1 to 41-m. In each of the 2×2 optical switches 41-1 to 41-m, in the case where each of the optical signals from the demultiplexing section 40A passes through the present node, the input port connected to the demultiplexing section 40A and the output port connected to each of the variable optical attenuators 42-1 to 42-m are connected to each other, and in the case where the optical signal is dropped by the present node, the input port connected to the demultiplexing section 40A and the output port that is not connected to each of the variable optical attenuators 42-1 to 42-m are connected to each other. Further, in the case of adding the optical signal at the present node, the input port that is not connected to the demultiplexing section 40A and the output port connected to each of the variable optical attenuators 42-1 to 42-m are connected to each other. Then, the optical signals sent to the variable optical attenuators 42-1 to 42-m through the 2×2 optical switches 41-1 to 41-m are sent to the multiplexing section 40B after being adjusted to the required level.

The optical signals input to the multiplexing section 40B are multiplexed in a state of ensuring the required bandwidth corresponding to each bit rate, and the WDM signal light is output to the optical transmission path 120 via the optical preamplifier 43B and the multiplexer 46A. Further, the supervisory signal generated in the OSC optical sender 46B in accordance with the transmission information from the control circuit 45 is multiplied with this WDM signal light.

In this manner, according to the present optical add drop apparatus 140, it becomes possible to demultiplex and multiplex reliably optical signals of each wavelength in a state of ensuring the required bandwidth corresponding to each bit rate.

Figure 15:
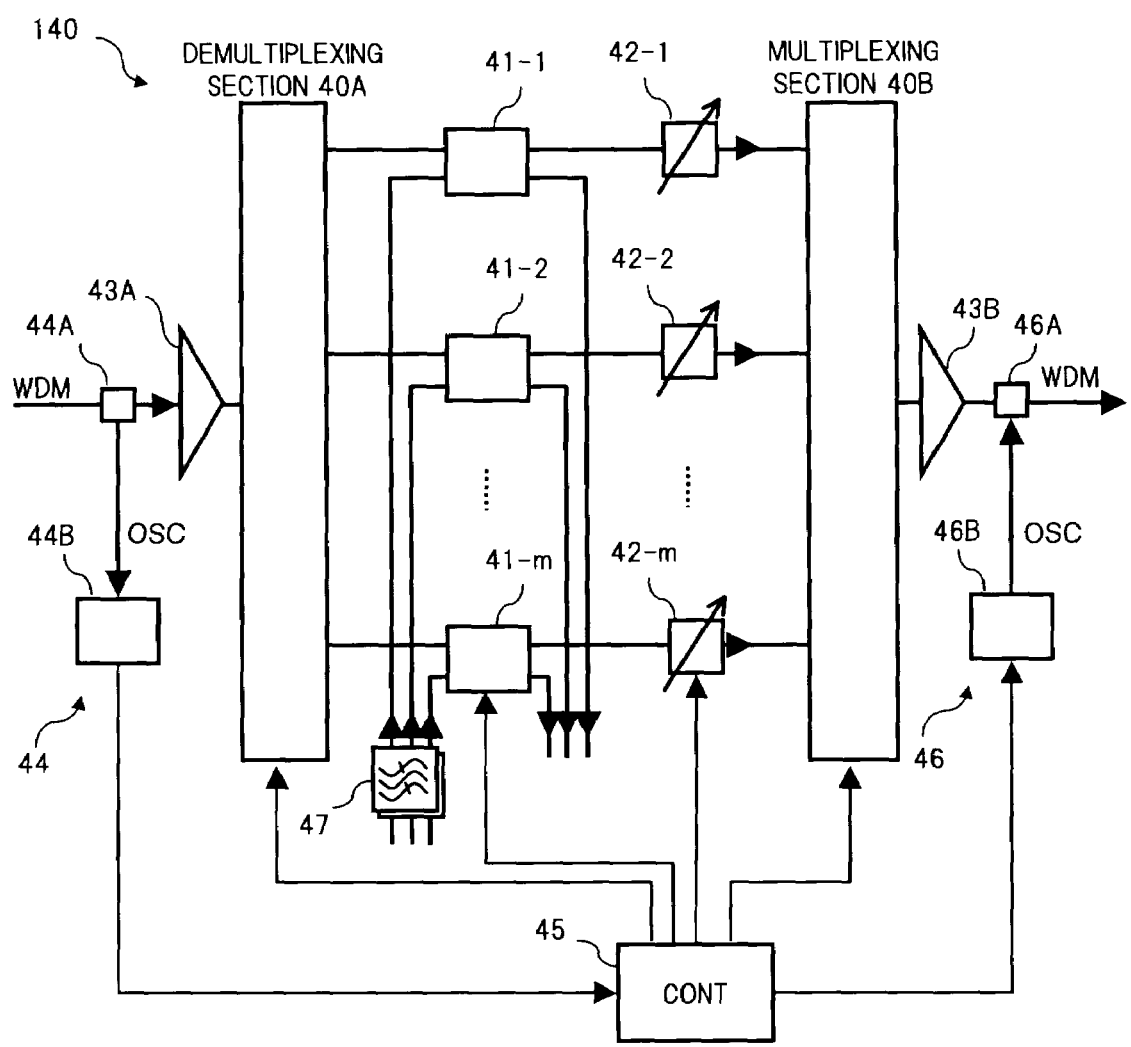
FIG. 15 is a constitutional diagram showing an application example related to the optical add drop apparatus to which the basic constitution of the present invention is applied.

In the above-described embodiment of the optical add drop apparatus 140, a case has been shown where optical signals added at the present node are input to the 2×2 optical switches 41-1 to 41-m directly. However, as shown in FIG. 15 for example, the arrangement may be such that an optical band pass filter 47 having bandwidth according to the signal wavelength band of optical signal to be added is inserted in the previous stage of each of the 2×2 optical switches 41-1 to 41-m. Thus, leakage of components into the signal wavelength bands of other signals due to the signal spectrum extension can be eliminated, thereby capable of reducing an amount of crosstalk. In the constitution in which a reduction in the amount of crosstalk is achieved in this manner, it is also possible to use a typical optical coupler as the multiplexing section 40B.

Figure 16:
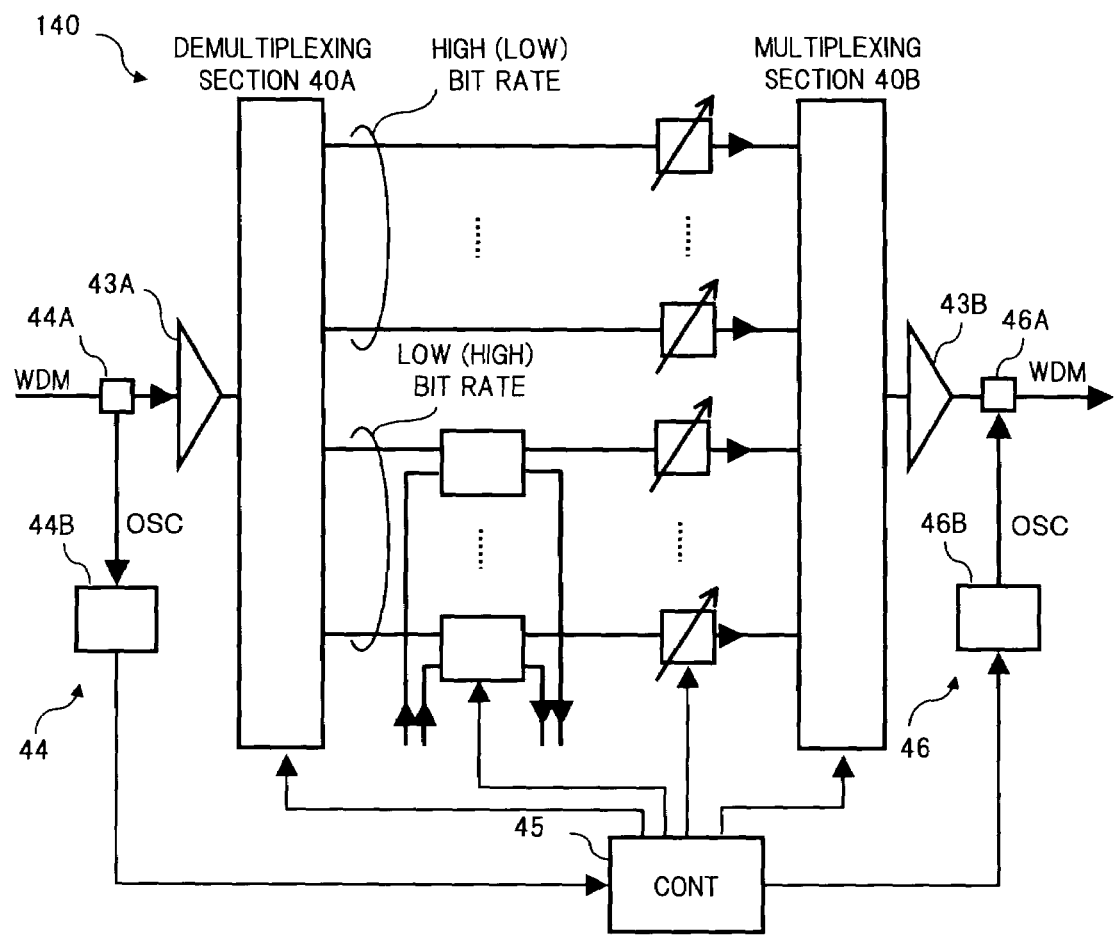
FIG. 16 is a constitutional diagram showing another application example related to the optical add drop apparatus to which the basic constitution of the present invention is applied.

Furthermore, in the above embodiment of the optical add drop apparatus 140, the constitution has been shown in which the 2×2 optical switches 41-1 to 41-m are provided for the optical signals of each wavelength output from the demultiplexing section 40A. However, the present invention is not limited thereto. For example, in the case where either the optical signal of high bit rates or the optical signal of low bit rates is added or dropped at the corresponding node, it is possible to omit the 2×2 optical switches corresponding to the optical signals of bit rates that are not added or dropped among the optical signals output from the demultiplexing section 40A as shown in FIG. 16.

Moreover, in each embodiment of the above optical transmission terminal apparatus, optical reception terminal apparatus and optical add drop apparatus, the descriptions have been made assuming the case where optical signals two bit rates at different wavelength arrangement spacing are intermixed. However, the present invention can be similarly applied to the case where optical signals of more than two bit rates are intermixed.

INDUSTRIAL APPLICABILITY

According to the present invention, it is possible to provide an optical transmission terminal apparatus, an optical reception terminal apparatus and an optical add drop apparatus, that enable an efficient wavelength arrangement of optical signals of a plurality of bit rates a different wavelength arrangement spacing, and that are of upgradeable to high bit rates, and also it becomes possible to realize large capacity of optical communication by constituting a WDM optical communication system using these apparatuses, so industrial applicability is great.

What is claimed are:

1. A wavelength division multiplexing optical communication system for transmitting wavelength division multiplexed signal light in which optical signals of a plurality of bit rates at different wavelength arrangement spacing are arranged in a predetermined signal wavelength band, wherein when performing at least one of a demultiplexing process for demultiplexing wavelength division multiplexed signal light to generate a plurality of optical signals and a multiplexing process for multiplexing a plurality of optical signals to generate wavelength division multiplexed signal light, in accordance with a plurality of wavelength regions into which said signal wavelength band is divided on the basis of a wavelength width unit set according to a minimum wavelength arrangement spacing, said wavelength division multiplexing optical communication system comprising:

a signal control section capable of setting a bandwidth of each optical signal to an integral multiple of said wavelength width unit, using optical switches controlled by a control circuit, wherein said signal control section sets said bandwidth of each of the optical signals of different bit rates so as to approximately coincide with wavelength arrangement spacing corresponding to each bit rate.

2. An optical transmission terminal apparatus for transmitting wavelength division multiplexed signal light in which optical signals of a plurality of bit rates at different wavelength arrangement spacing are arranged in a predetermined signal wavelength band, wherein when performing a multiplexing process for multiplexing a plurality of optical signals to generate wavelength division multiplexed signal light, in accordance with a plurality of wavelength regions into which said signal wavelength band is divided on the basis of a wavelength width unit set according to a minimum wavelength arrangement spacing, said optical transmission terminal apparatus comprising:

a multiplexing section capable of setting a bandwidth of each optical signal to an integral multiple of said wavelength width unit, using optical switches controlled by a control circuit, and said multiplexing section sets said the bandwidth of each of the optical signals of different bit rates so as to approximately coincide with wavelength arrangement spacing corresponding to each bit rate.

3. An optical transmission terminal apparatus according to claim 2, further comprising:

a plurality of optical senders that generate optical signals at a plurality of bit rates at different wavelength arrangement spacing to send them to said multiplexing section, wherein said multiplexing section comprises:

a plurality of demultiplexers that demultiplex optical signals from said optical senders corresponding to the number of said wavelength regions;

optical switches corresponding to the number of said wavelength regions, each of which has a plurality of input ports to which each light from said demultiplexers are input, and one output port, and selects one of said plurality of input ports to connect to said output port;

a multiplexer that multiplexes each light from said optical switches in accordance with said plurality of wavelength regions to generate wavelength division multiplexed signal light; and a control circuit that controls the setting of operations of said optical switches such that bandwidth of said each optical signal is approximately the same as the wavelength arrangement spacing corresponding to each bit rate, according to transmission information of bit rates and the wavelength arrangement of optical signals generated in said optical senders.

4. An optical transmission terminal apparatus according to claim 2, further comprising:

a plurality of optical senders that generate optical signals at a plurality of bit rates at different wavelength arrangement spacing to send them to said multiplexing section, wherein said multiplexing section comprises:

previous stage multiplexers that correspond to the optical signals from said plurality of optical senders, which categorized as groups corresponding to a value obtained by dividing maximum wavelength arrangement spacing by minimum wavelength arrangement spacing, to multiplex said optical signals for each group, later stage demultiplexers that demultiplex light multiplexed for each group corresponding to the number of said wavelength regions, optical switches corresponding to the number of said wavelength regions, each of which has a plurality of input ports to which each light from said latter stage demultiplexers are input, and one output port, and selects one of said plurality of input ports to connect to said output port, and further the number of input ports of said optical switches is made to be the number corresponding to the value obtained by dividing the maximum wavelength arrangement spacing by the minimum wavelength arrangement spacing, a multiplexer that multiplexes each light from said optical switches in accordance with said plurality of wavelength regions to generate wavelength division multiplexed signal light, and a control circuit that controls the setting of operations of said optical switches such that bandwidth of said each optical signal is approximately the same as the wavelength arrangement spacing corresponding to each bit rate, according to transmission information of bit rates and the wavelength arrangement of optical signals generated in said optical senders.

5. An optical transmission terminal apparatus according to claim 4, wherein said previous stage multiplexer includes a pair of optical filters previously set such that multiplexing characteristics are changed periodically corresponding to the maximum wavelength arrangement spacing, and the center wavelengths of the filters are shifted from each other by the minimum wavelength arrangement spacing, and an interleaver that multiplexes light multiplexed by said optical filters so as to be at the minimum wavelength arrangement spacing.

6. An optical reception terminal apparatus for transmitting wavelength division multiplexed signal light in which optical signals of a plurality of bit rates at different wavelength arrangement spacing are arranged in a predetermined signal wavelength band, wherein when performing a demultiplexing process for demultiplexing wavelength division multiplexed signal light to generate a plurality of optical signals, in accordance with a plurality of wavelength regions into which said signal wavelength band is divided on the basis of a wavelength width unit set according to a minimum wavelength arrangement spacing, said optical reception terminal apparatus comprising:

a demultiplexing section capable of setting a bandwidth of each optical signal to an integral multiple of said wavelength width unit, using optical switches controlled by a control circuit, and said demultiplexing section sets said bandwidth of each of the optical signals of different bit rates so as to approximately coincide with wavelength arrangement spacing corresponding to each bit rate.

7. An optical reception terminal apparatus according to claim 6, further comprising:
a plurality of optical receivers for processing the optical signals demultiplexed in said demultiplexing section, wherein said demultiplexing section comprises:
a demultiplexer that demultiplexes wavelength division multiplexed signal light in accordance with said plurality of wavelength regions;
optical switches corresponding to the number of said wavelength regions, each of which has one input port to which each light from said demultiplexer are input, and a plurality of output ports, and selects one of said plurality of output ports to connect to said input port;
multiplexers corresponding to the number of output ports of each of said optical switches, each of which is connected to any one output port of each of said optical switches, and sends optical signals generated by multiplexing each light from said optical switches to said optical receivers; and
a control circuit that controls the setting of operations of said optical switches such that bandwidth of said each optical signal is approximately the same as the wavelength arrangement spacing corresponding to each bit rate, according to transmission information of bit rates and the wavelength arrangement of optical signals included in said wavelength division multiplexed signal light.

8. An optical reception terminal apparatus according to claim 6, further comprising:
a plurality of optical receivers for processing the optical signals demultiplexed in said demultiplexing section, wherein said demultiplexing section comprises:
a demultiplexer that demultiplexes wavelength division multiplexed signal light in accordance with said plurality of wavelength regions,
optical switches corresponding to the number of said wavelength regions, each of which has one input port to which each light from said demultiplexer are input, and a plurality of output ports, and selects one of said plurality of output ports to connect to said input port, and further the number of output ports of said optical switches is made to be a number corresponding to the value obtained by dividing the maximum wavelength arrangement spacing by the minimum wavelength arrangement spacing,
previous stage multiplexers that correspond to each light from said optical switches, which categorized as groups corresponding to a value obtained by dividing maximum wavelength arrangement spacing by minimum wavelength arrangement spacing, to multiplex said light for each group,
latter stage demultiplexers that send optical signals generated by demultiplexing each light multiplexed for each group to said optical receivers, and
a control circuit that controls the setting of operations of said optical switches such that bandwidth of said each optical signal is approximately the same as the wavelength arrangement spacing corresponding to each bit rate, according to transmission information of bit rates and the wavelength arrangement of optical signals included in said wavelength division multiplexed signal light.

9. An optical reception terminal apparatus according to claim 8, wherein said latter stage demultiplexer comprises an interleaver that demultiplexed the light multiplexed by said previous stage multiplexer into a first signal group arranged in accordance with the maximum wavelength arrangement spacing and a second signal group with the center wavelength thereof being shifted from said first signal group by the minimum wavelength arrangement spacing, and a pair of optical filters previously set such that multiplexing characteristics are changed periodically corresponding to the maximum wavelength arrangement spacing, and the center wavelengths of the filters are shifted from each other by the minimum wavelength arrangement spacing, said pair of optical filters demultiplexing the signal groups from said interleaver, respectively.

10. An optical add drop apparatus for adding and dropping optical signals in wavelength division multiplexed signal light in which optical signals of a plurality of bit rates at different wavelength arrangement spacing are arranged in a predetermined signal wavelength band,
wherein when performing a demultiplexing process for demultiplexing wavelength division multiplexed signal light to generate a plurality of optical signals and a multiplexing process for multiplexing a plurality of optical signals to generate wavelength division multiplexed signal light, in accordance with a plurality of wavelength regions into which said signal wavelength band is divided on the basis of a wavelength width unit set according to a minimum wavelength arrangement spacing, said optical add drop apparatus comprising:
a demultiplexing section and a multiplexing section each capable of setting a bandwidth of each optical signal to an integral multiple of said wavelength width unit, using optical switches controlled by a control circuit, and each of said demultiplexing section and said multiplexing section sets said bandwidth of each of the optical signals of different bit rates so as to approximately coincide with wavelength arrangement spacing corresponding to each bit rate.

11. An optical add drop apparatus according to claim 10, wherein said demultiplexing section includes:
a demultiplexer that demultiplexes wavelength division multiplexed signal light in accordance with said plurality of wavelength regions;
optical switches corresponding to the number of said wavelength regions, each of which has one input port to which light from said demultiplexer is input, and a plurality of output ports, and selects one of said plurality of output ports to connect to said input port;
multiplexers corresponding to the number of output ports of said optical switches, each of which is connected to any one output port of each of said optical switches, that each sends optical signals generated by multiplexing each light from each optical switch to said multiplexing section side; and
a control circuit that controls the setting of operations of said optical switches such that bandwidth of said each optical signal is approximately the same as the wavelength arrangement spacing corresponding to each bit rate, according to transmission information of bit rates and the wavelength arrangement of optical signals included in said wavelength division multiplexed signal light.

12. An optical add drop apparatus according to claim 10, wherein said demultiplexing section includes:

a demultiplexer that demultiplexes wavelength division multiplexed signal light in accordance with said plurality of wavelength regions, optical switches corresponding to the number of said wavelength regions, each of which has one input port to which light from said demultiplexer is input, and a plurality of output ports, and selects one of said plurality of output ports to connect to said input port, and further the number of output ports of said optical switches is made to be the number corresponding to the value obtained by dividing the maximum wavelength arrangement spacing by the minimum wavelength arrangement spacing, previous stage multiplexers that correspond to each light from said optical switches, which categorized as groups corresponding to a value obtained by dividing maximum wavelength arrangement spacing by minimum wavelength arrangement spacing, to multiplex said light for each group, latter stage demultiplexers that send optical signals generated by demultiplexing each light multiplexed for each group to said multiplexing section side, and a control circuit that controls the setting of operations of said optical switches such that bandwidth of said each optical signal is approximately the same as the wavelength arrangement spacing corresponding to each bit rate, according to transmission information of bit rates and the wavelength arrangement of optical signals included in said wavelength division multiplexed signal light.

13. An optical add drop apparatus according to claim 10, wherein said multiplexing section includes:

a plurality of demultiplexers that demultiplex optical signals from said demultiplexing section side corresponding to the number of said wavelength regions;

optical switches corresponding to the number of said wavelength regions, each of which has a plurality of input ports to which each light from said demultiplexers are input, and one output port, and selects one of said plurality of input ports to connect to said output port;

a multiplexer that multiplexes each light from said optical switches in accordance with said plurality of wavelength regions to generate wavelength division multiplexed signal light; and a control circuit that controls the setting of operations of said optical switches such that bandwidth of said each optical signal is approximately the same as the wavelength arrangement spacing corresponding to each bit rate, according to transmission information of bit rates and the wavelength arrangement of optical signals included in said wavelength division multiplexed signal light.

14. An optical add drop apparatus according to claim 10, wherein said multiplexing section comprises:

previous stage multiplexers that correspond to each optical signal from said demultiplexing section side, which categorized as groups corresponding to a value obtained by dividing maximum wavelength arrangement spacing by minimum wavelength arrangement spacing, to multiplex said light for each group, latter stage demultiplexers that demultiplex each light multiplexed for each group corresponding to the number of said wavelength regions, optical switches corresponding to the number of said wavelength regions, each of which has a plurality of input ports to which each light from said demultiplexers are input, and one output port, and selects one of said plurality of input ports to connect to said output port, and further the number of input ports of said optical switches is made to be the number corresponding to the value obtained by dividing the maximum wavelength arrangement spacing by the minimum wavelength arrangement spacing, a multiplexer that multiplexes each light from said optical switches in accordance with said plurality of wavelength regions to generate wavelength division multiplexed signal light, and a control circuit that controls the setting of operations of said optical switches such that bandwidth of said each optical signal is approximately the same as the wavelength arrangement spacing corresponding to each bit rate, according to transmission information of bit rates and the wavelength arrangement of optical signals included in said wavelength division multiplexed signal light.

* * * * *

UNITED STATES PATENT AND TRADEMARK OFFICE
CERTIFICATE OF CORRECTION

PATENT NO.         : 7,088,922 B2                                            Page 1 of 1
APPLICATION NO. : 10/405936
DATED              : August 8, 2006
INVENTOR(S)        : Hiroaki Tomofuji et al.

It is certified that error appears in the above-identified patent and that said Letters Patent is hereby corrected as shown below:

Column 19, Line 47, change "comprising;" to --comprising:--.

Column 20, Line 18, change "later" to --latter--.

Signed and Sealed this

Twenty-sixth Day of December, 2006

JON W. DUDAS
*Director of the United States Patent and Trademark Office*